(12) United States Patent
Minami

(10) Patent No.: US 7,622,148 B2
(45) Date of Patent: Nov. 24, 2009

(54) METHOD FOR MANUFACTURING ELECTROPHORETIC DISPLAY ELEMENT

(75) Inventor: Masato Minami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 11/782,280

(22) Filed: Jul. 24, 2007

(65) Prior Publication Data

US 2008/0020131 A1   Jan. 24, 2008

Related U.S. Application Data

(62) Division of application No. 10/448,399, filed on May 30, 2003, now abandoned.

(30) Foreign Application Priority Data

May 31, 2002   (JP) ............................... 2002-159532

(51) Int. Cl.
*B05D 5/06*   (2006.01)
(52) U.S. Cl. .............................. 427/68; 427/64; 427/402
(58) Field of Classification Search .................... 427/68, 427/64
See application file for complete search history.

(56) References Cited

U.S. PATENT DOCUMENTS

| | | | |
|---|---|---|---|
| 5,667,572 A * | 9/1997 | Taniguchi et al. ........ | 106/31.36 |
| 5,975,680 A | 11/1999 | Wen et al. ..................... | 347/43 |
| 6,025,896 A | 2/2000 | Hattori et al. | |
| 6,377,387 B1 * | 4/2002 | Duthaler et al. ............. | 359/296 |
| 6,506,438 B2 | 1/2003 | Duthaler et al. ............... | 427/58 |
| 6,672,921 B1 * | 1/2004 | Liang et al. .................. | 445/24 |
| 6,717,716 B2 * | 4/2004 | Kawai ......................... | 359/296 |
| 6,906,851 B2 | 6/2005 | Yuasa | |
| 2002/0041423 A1 * | 4/2002 | Ogawa ........................ | 359/272 |

FOREIGN PATENT DOCUMENTS

| | | |
|---|---|---|
| JP | 64-86116 | 3/1989 |
| JP | 11-119264 | 4/1999 |
| JP | 2000-035769 | 2/2000 |
| JP | 2000-35769 | 2/2000 |
| JP | 2000035769 A * | 2/2000 |
| WO | WO 00/59625 | 10/2000 |

OTHER PUBLICATIONS

Japanese Communication dated Apr. 1, 2008, regarding Application No. 2002-159532.

* cited by examiner

*Primary Examiner*—David Turocy
(74) *Attorney, Agent, or Firm*—Fitzpatrick, Cella, Harper & Scinto

(57) ABSTRACT

A method for manufacturing an electrophoretic display element including partitions, which are arranged on a substrate and each of which contains a suspension composed of electrophoretic particles and a dispersion medium and a coating material for covering the suspension, is provided. The method includes the step of providing at least two nozzles at a predetermined distance from the substrate, discharging the above-mentioned suspension from one nozzle, and discharging the coating material from another nozzle, so as to adhere to the substrate.

9 Claims, 27 Drawing Sheets

ONE PIXEL

METHOD FOR MANUFACTURING ELECTROPHORETIC DISPLAY ELEMENT

This application is a division of U.S. patent application Ser. No. 10/448,399, filed May 30, 2003, now abandoned.

BACKGROUND OF THE INVENTION

1. Field of the Invention

The present invention relates to a method for manufacturing an electrophoretic display element capable of realizing high-definition color display.

2. Description of the Related Art

In recent years, many electrophoretic display elements using microcapsules have been proposed. Examples thereof include, for example, an electrophoretic display element composed of microcapsules, each enclosing electrophoretic particles and a suspension with a color tone different from that of the electrophoretic particles (Japanese Patent Laid-Open No. 64-86116) and an electrophoretic display element composed of microcapsules, each enclosing two types of electrophoretic particles different in the color tone and the polarity and a clear, colorless suspension (Japanese Patent Laid-Open No. 11-119264). Conventionally, such a microcapsule for electrophoretic display is prepared primarily by any one of an interfacial polymerization method, an in situ polymerization method and a phase separation method (a coacervation method), the microcapsule is mixed with a binder resin, the resulting resin composition is applied on an electrode substrate by using a roll coater method, a roll laminator method, a screen printing method, a spray method and the like, and therefore, an electrophoretic display element is prepared. This has been a general manufacturing method.

However, when high-definition display was intended, there was a problem in that the microcapsules had to be precisely arranged on the electrode constituting display pixels, and the microcapsules had to be driven and be controlled independently.

When color display was intended, there was also a problem in that uniform microcapsules of different display colors had to be arranged in predetermined locations on the electrode substrate on a pixel basis, and each of these microcapsules had to be driven and be controlled independently.

Conventional microcapsules for electrophoretic display elements were prepared primarily by an interfacial polymerization method, an in situ polymerization method, a phase separation method (a coacervation method) and the like. In general, microcapsules prepared by these methods had broad particle size distributions, and in order to prepare microcapsules having desired particle diameters, classification operation had to be performed by a screening method, a gravity separation method and the like. Consequently, it was difficult to prepare uniform microcapsules by conventional manufacturing methods.

Furthermore, it was impossible to precisely arrange microcapsules in predetermined locations on an electrode substrate by mixing microcapsules with a binder resin, and applying the resulting resin composition on an electrode substrate by using a roll coater method, a roll laminator method, a screen printing method, a spray method and the like.

SUMMARY OF THE INVENTION

The present invention provides a method for manufacturing an electrophoretic display element including partitions, which are arranged on a substrate and each of which contains a suspension composed of electrophoretic particles and a dispersion medium and a coating material covering the above-mentioned suspension, the method including the step of providing at least two nozzles at a predetermined distance from the substrate, discharging the above-mentioned suspension from one nozzle, and discharging the above-mentioned coating material from another nozzle so as to adhere to the substrate.

In the present invention, the suspension containing electrophoretic particles and the dispersion medium may be discharged from one discharge hole of the nozzle having at least two discharge holes, and the coating material for covering the suspension may be discharged from the other discharge hole.

Since the nozzles are arranged in the locations at a predetermined distance from the substrate, the suspension and the coating material discharged from the respective nozzles are integrated before adhesion to the substrate, a condition in which the coating material covers the suspension is brought about, and adhesion to the substrate is performed in this condition. The coating material is cured during flying or after adhesion to the substrate, and therefore, a microcapsule is formed.

Since the nozzles can uniformly control the discharge amounts of the suspension and the coating material, microcapsules having a uniform size can be formed.

The distance between the nozzle and the substrate must be enough to achieve the above-mentioned covering condition. However, since discharge is performed at a predetermined discharge velocity, adhesion can be performed in a predetermined location on the substrate.

The above-mentioned partitions may be a uniform, closed space composed of the substrate and the coating material. When the suspension containing the electrophoretic particles and the dispersion medium is discharged from one nozzle of a multi-nozzle composed of at least two nozzles onto a desired location on the substrate provided with an electrode, and the coating material for covering the suspension is discharged from another nozzle, a small partition enclosing the electrophoretic particles and the dispersion medium can be formed.

According to the present invention, an electrophoretic display element capable of realizing high-definition color display can be provided.

That is, when a multi-nozzle is used, and three types of small partition, which enclose the dispersion medium colored in one of the three primary colors and the electrophoretic particles having a color different from the three primary colors and which are differentiated by the colors of the three primary colors, are formed in desired locations on the electrode substrate, high-definition color display can be achieved.

According to another aspect of the present invention, a method for manufacturing an electrophoretic display element capable of realizing high-definition color display is provided, wherein a multi-nozzle is used, and three types of small partition, which enclose the clear, colorless dispersion medium, electrophoretic particles having one of the three primary colors and another type of electrophoretic particles different therefrom in polarity and color and which are differentiated by the colors of the three primary colors, are formed in desired locations on the electrode substrate.

According to another aspect of the present invention, a method for manufacturing an electrophoretic display element capable of realizing high-definition color display is provided, wherein the discharge device having a multi-nozzle is used, and a small partition enclosing the dispersion medium composed of the clear, colorless dispersion medium and electrophoretic particles is arranged on a pair of electrodes formed in predetermined locations on the substrate while one electrode has one of the three primary colors and another electrode has a color different therefrom.

Further objects, features and advantages of the present invention will become apparent from the following description of the preferred embodiments with reference to the attached drawings.

DESCRIPTION OF THE PREFERRED EMBODIMENTS

Figure 1A:
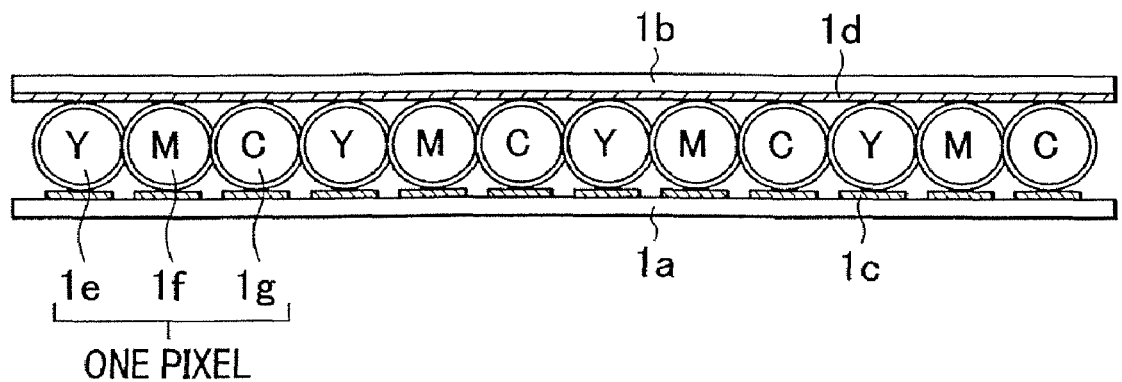
FIG. 1A is a sectional view showing an embodiment of an electrophoretic display element of the present invention.
Figure 1B:
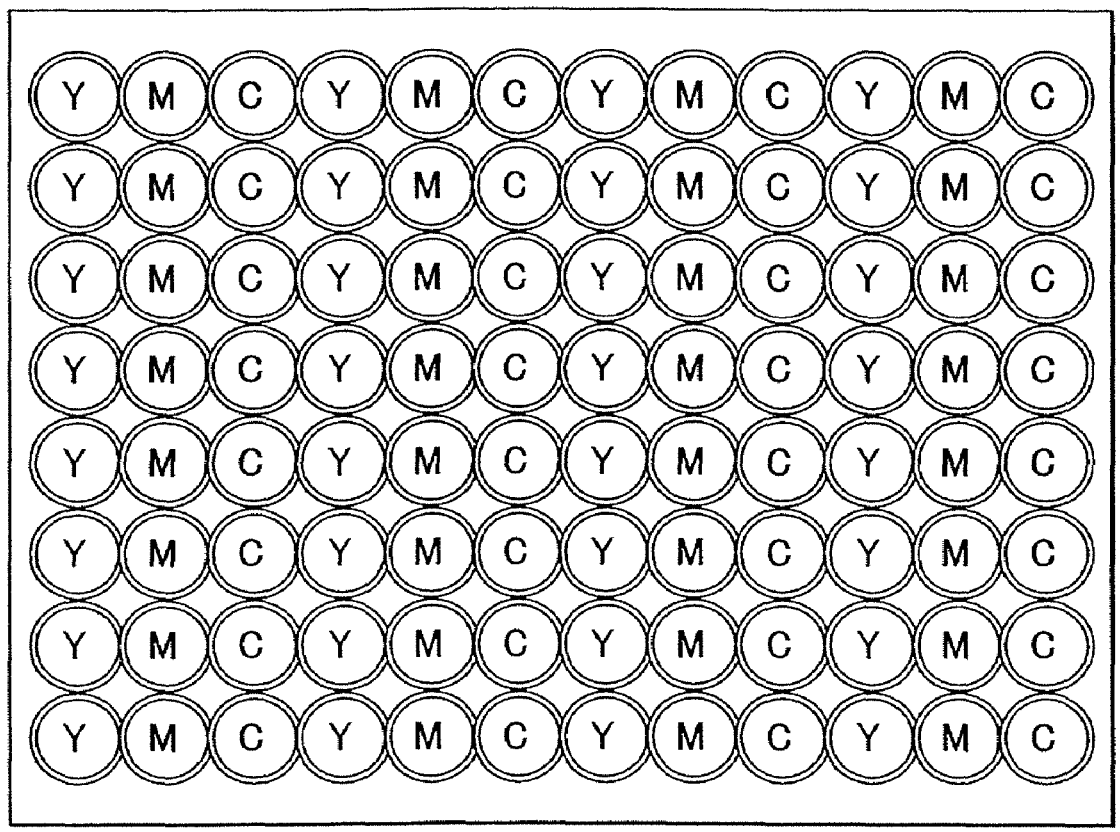
FIG. 1B is a top view.

FIGS. 1A and 1B are configuration diagrams showing an embodiment of an electrophoretic display element of the present invention, where a small partition is a microcapsule. FIG. 1A is a sectional view of an electrophoretic display element, and FIG. 1B is a top view schematically showing an arrangement of microcapsules. As shown in FIG. 1A, the electrophoretic display element of the present invention has a structure in which a first electrode 1c and a second electrode 1d are provided on substrates 1a and 1b, respectively, and microcapsules are arranged on the first electrode 1c while being held between the first electrode 1c and the second electrode 1d. The microcapsule encloses a dispersion medium colored in one of the three primary colors and electrophoretic particles having a color different from the three primary colors. Here, three types of microcapsule, 1e, 1f, and 1g are arranged, and these microcapsules are differentiated by dispersion media, each colored yellow (Y), magenta (M) or cyan (C), hereafter abbreviated as Y, M or C. In this electrophoretic display element, the substrate 1b including the second electrode 1d is a display surface. As shown in FIG. 1B, these three types of microcapsule 1e, 1f, and 1g have a uniform particle diameter, and are provided on the first electrode 1c in a two-dimensional arrangement in the row direction and the column direction, as well as in a stripe arrangement in which microcapsules having the same color are aligned in the column direction. The substrate 1b and the second electrode 1d are not shown in FIG. 1B.

In order to prevent deviation of the locations of the microcapsules 1e, 1f, and 1g arranged on the substrate, spaces between the microcapsules 1e, 1f, and 1g may be impregnated with a resin binder having a light-transmission property, and therefore, fixation onto the substrate may be performed.

The first electrode 1c is a pixel electrode capable of independently applying a desired electric field to each microcapsule arranged as shown in FIG. 1B. This pixel electrode is provided with switching elements, a selection signal is applied from a matrix driving circuit, not shown in the drawing, on a row basis, a control signal and an output from a driving transistor are applied to each column, and therefore, a desired electric field can be applied to each of the microcapsules.

Figure 2A:
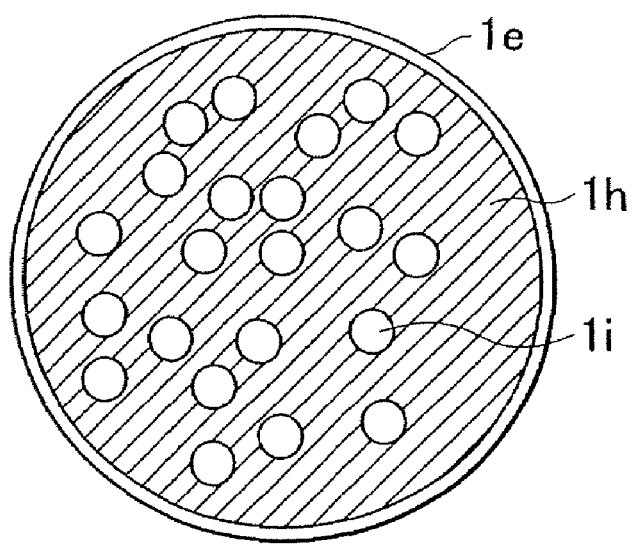
FIGS. 2A to 2C are configuration diagrams of microcapsules in an electrophoretic display element of the present invention.
Figure 2B:
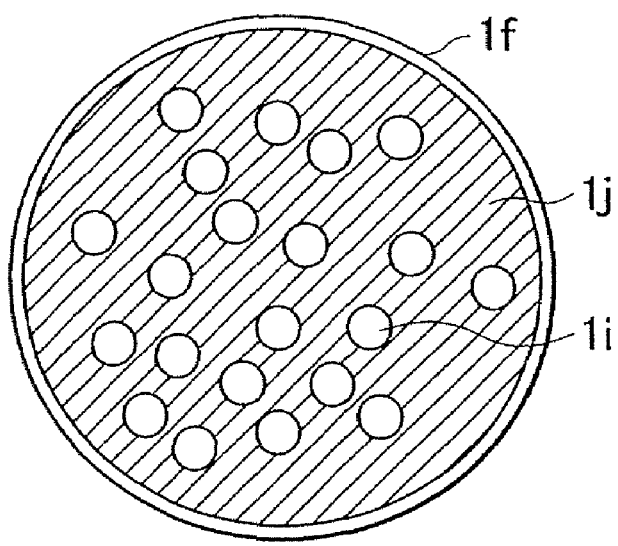
Figure 2C:
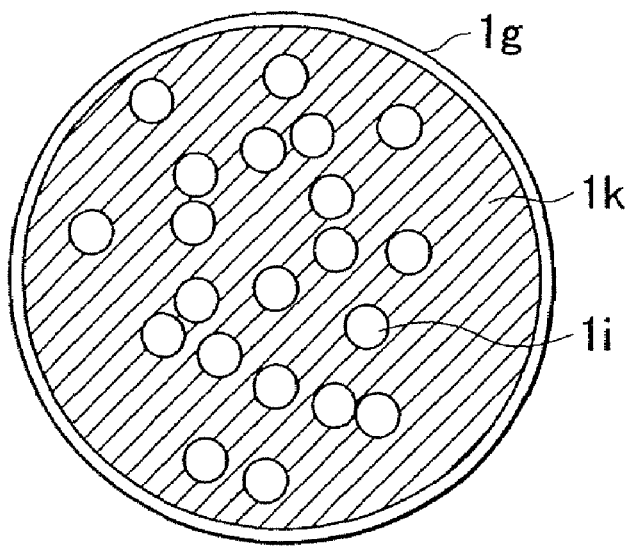

The configurations of the three types of microcapsule are shown in FIGS. 2A to 2C. FIG. 2A is a diagram showing a microcapsule $1e$ for Y, and shows a condition in which white electrophoretic particles $1i$ are dispersed in a dispersion medium $1h$ colored Y. FIG. 2B is a diagram showing a microcapsule $1f$ for M, and shows a condition in which white electrophoretic particles $1i$ are dispersed in a dispersion medium $1j$ colored M. FIG. 2C is a diagram showing a microcapsule $1g$ for C, and shows a condition in which white electrophoretic particles $1i$ are dispersed in a dispersion medium $1k$ colored C. Although white particles are shown here as electrophoretic particles, black particles may be used.

Figure 3A:
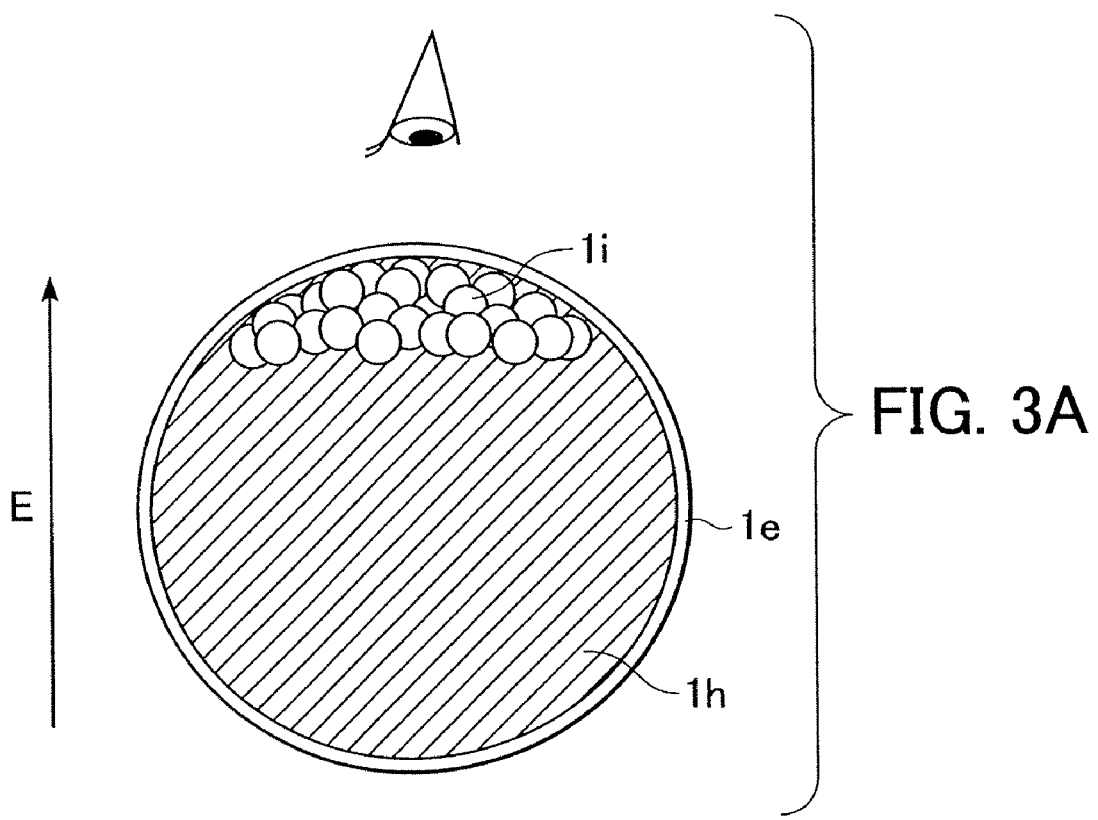
FIGS. 3A and 3B are schematic diagrams showing displaying method of microcapsules in an electrophoretic display element of the present invention.
Figure 3B:
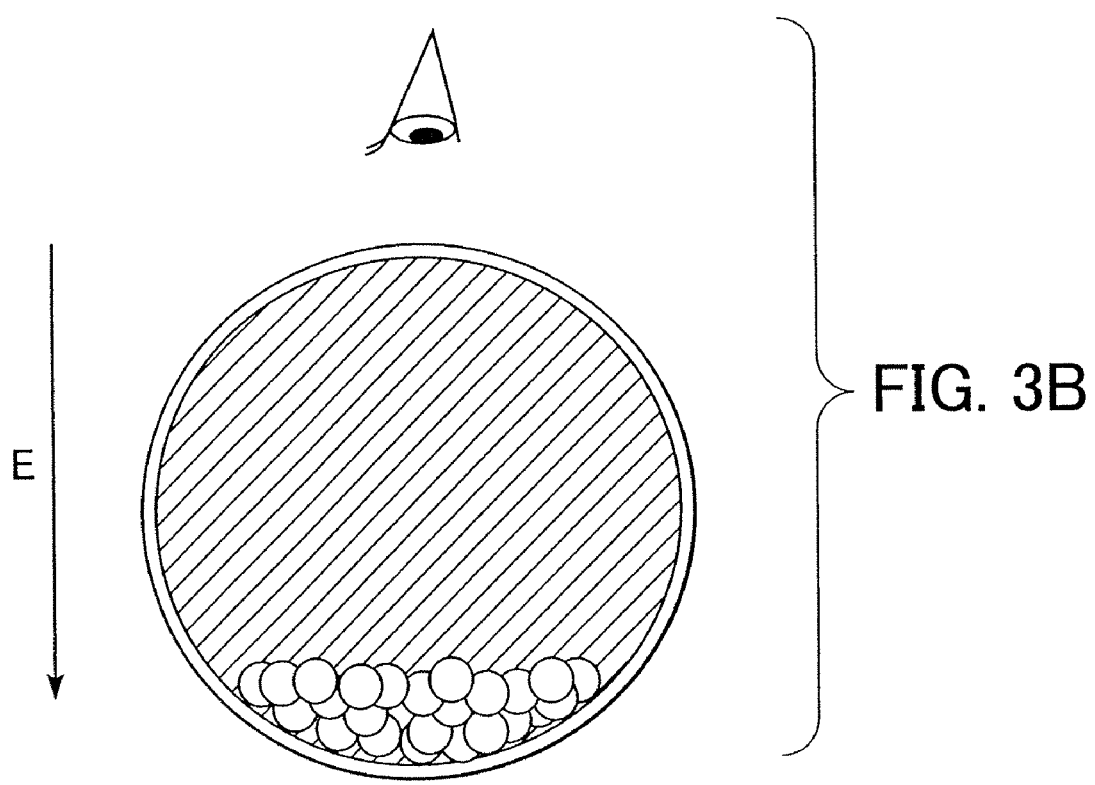

The display of a microcapsule held between electrodes will be described using the microcapsule $1e$ as an example with reference to FIGS. 3A and 3B. The microcapsule $1e$ encloses a dispersion medium $1h$ colored Y and white electrophoretic particles $1i$, and it is assumed that the white electrophoretic particles $1i$ are positively charged. When an electric field E is applied to the microcapsule $1e$ in the direction indicated by an arrow shown in FIG. 3A, the positively charged white electrophoretic particles $1i$ move to the upper side of the capsule, and distribute on the top surface. As a result, when the microcapsule $1e$ is observed from above, the microcapsule appears to be white due to the distribution of the white electrophoretic particles $1i$. On the other hand, when an electric field E is applied to the microcapsule $1e$ in the direction indicated by an arrow shown in FIG. 3B, the white electrophoretic particles $1i$ move to the lower side of the capsule, and distribute on the bottom surface. Consequently, when the microcapsule $1e$ is observed from above, the microcapsule appears to be Y which is the color of the dispersion medium.

In FIGS. 1A and 1B, each microcapsule held between the first electrode $1c$ and the second electrode $1d$ is controlled by an electric field applied by the first electrode $1c$, and each microcapsule displays the color of the particles or the color of the dispersion medium. The second electrode $1d$ is a transparent electrode formed in order to cover all the two-dimensionally arranged microcapsules, as shown in FIGS. 1A and 1B, with the same potential. The three types of microcapsule differentiated by the dispersion media being Y, M or C are arranged in a repeated order as YMCYMC in the row direction, as shown in FIG. 1B. The control is performed on the assumption that the display portion of one pixel is composed of successive three types of microcapsule $1e$, $1f$ and $1g$ described above. High-definition color display can be performed by controlling each pixel.

Figure 4A:
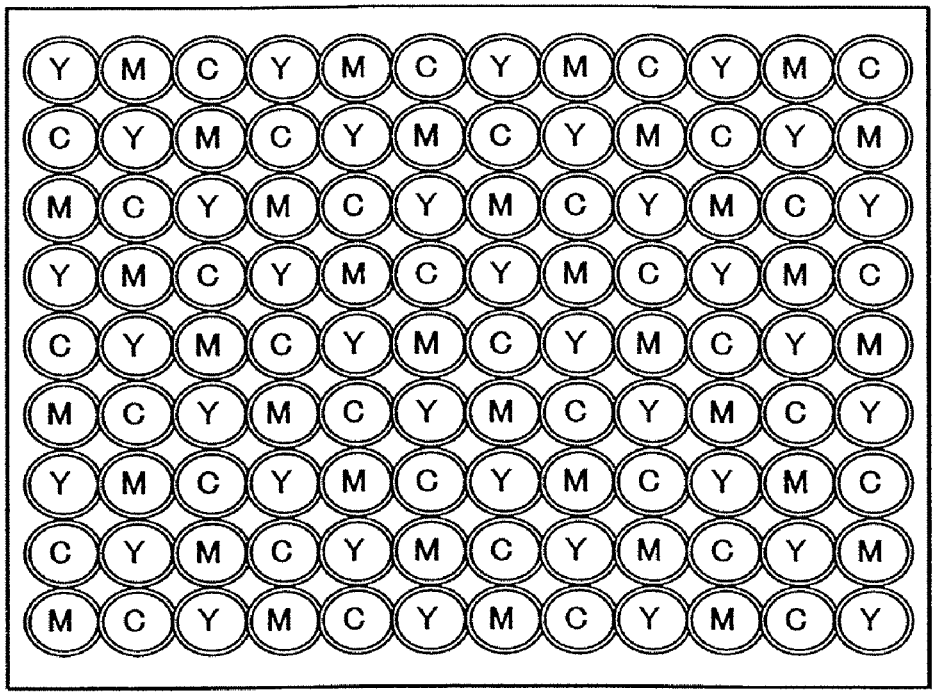
FIG. 4A is a diagram showing a mosaic arrangement of microcapsules.
Figure 4B:
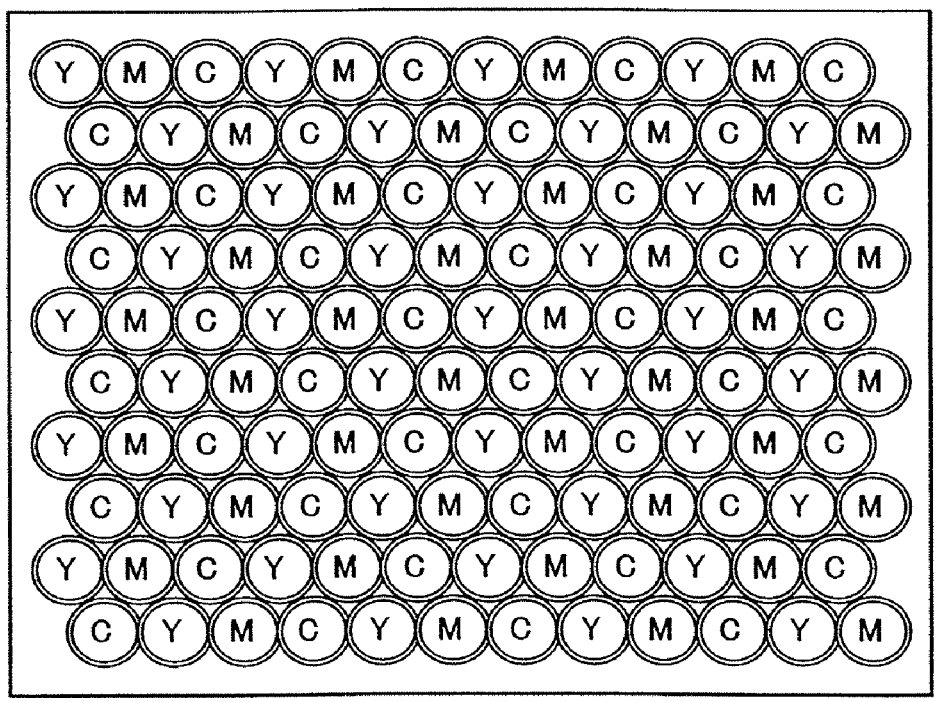
FIG. 4B is a diagram showing a triangular arrangement.

The two-dimensional arrangement of the microcapsules is not limited to the arrangement shown in FIG. 1B, and may be, for example, a mosaic arrangement shown in FIG. 4A and a triangular arrangement shown in FIG. 4B. Likewise, the configuration of the pixel is not limited to the pixel composed of three microcapsules which are three types of microcapsule successively arranged in a row, as in the present embodiment.

In the present embodiment, the color display was performed using dispersion media of the three primary colors, Y, M, and C. However, the color display may be performed using dispersion media of other three primary colors, red (R), green (G) and blue (B). The white particles were used for the electrophoretic particles. However, black particles may be used.

A method for manufacturing the present embodiment will be described with reference to FIGS. 5A to 5C. The first electrode $1c$ for controlling each microcapsule is formed by patterning on the substrate $1a$ (refer to FIG. 5A).

The substrate $1a$ is an arbitrary insulating member for supporting the electrophoretic display element, and glass, plastic and the like can be used therefor. The material for the first electrode $1c$ is not specifically limited, and Al, ITO and the like can be used.

Figure 5A:
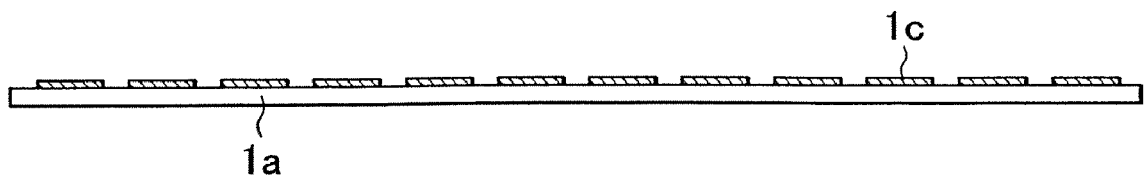
FIGS. 5A to 5C are step diagrams showing an example of a method for manufacturing an embodiment of an electrophoretic display element of the present invention.
Figure 5B:
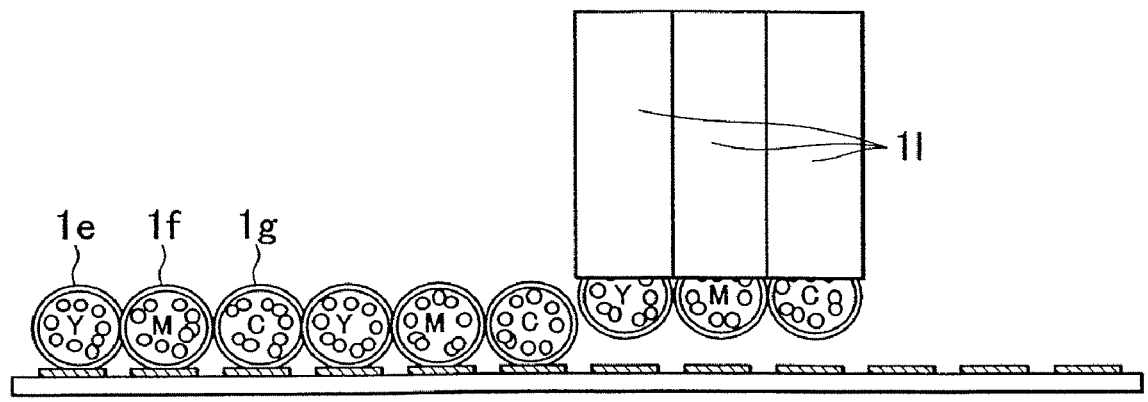

At least three types of multi-nozzle $1l$ are used, and three types of microcapsule $1e$, $1f$ and $1g$ enclosing dispersion media $1h$, $1j$ and $1k$ colored Y, M and C, respectively, and the white electrophoretic particles $1i$ are formed in desired locations on the first electrode $1c$ (refer to FIG. 5B).

Figure 6A:
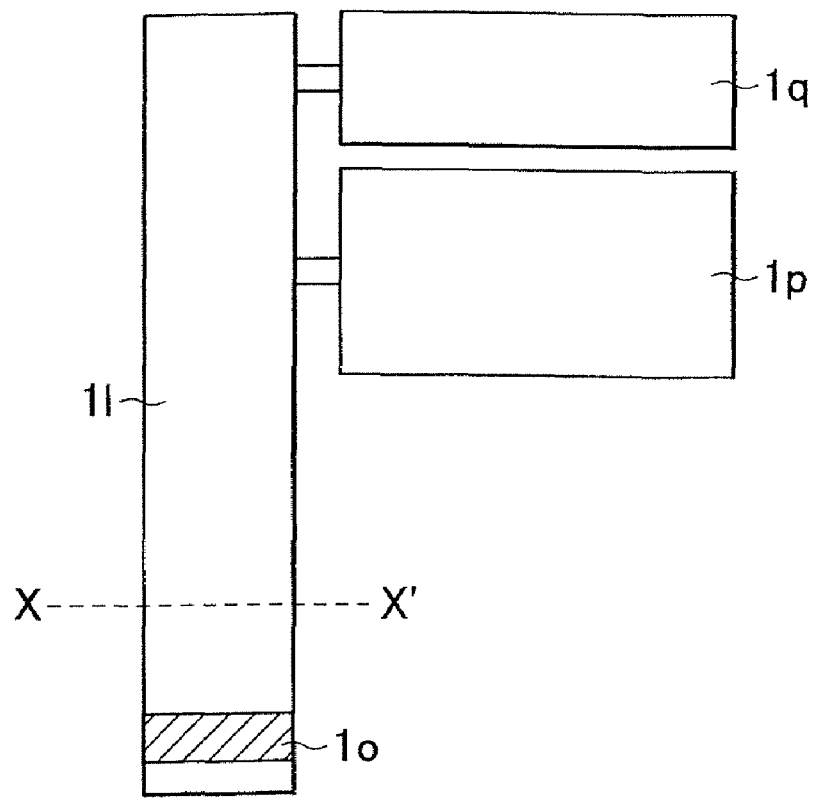
FIG. 6A is a schematic diagram of a multi-nozzle for preparing and arranging microcapsules in an electrophoretic display element of the present invention.
Figure 6B:
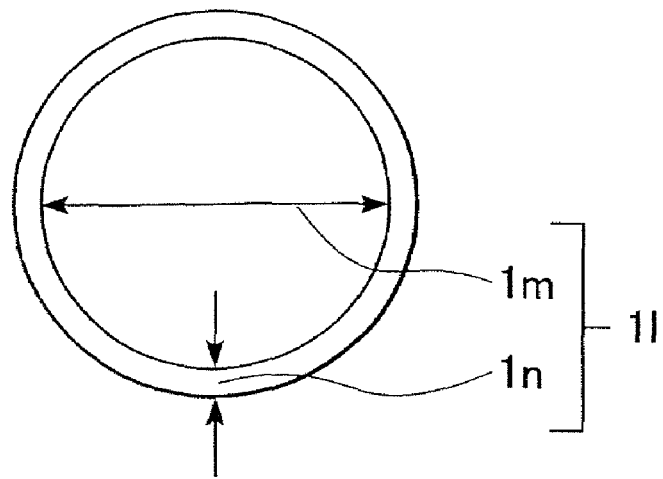
FIG. 6B is a sectional view of the section indicated by a line X-X' shown in FIG. 6A.

The multi-nozzle $1l$ of the present embodiment is shown in FIGS. 6A and 6B. FIG. 6A is a schematic diagram of the multi-nozzle $1l$, and FIG. 6B is a sectional view of the section indicated by a line X-X' shown in FIG. 6A. The multi-nozzle $1l$ is a concentric double-circle nozzle composed of a first nozzle $1m$ and a second nozzle in. The first nozzle $1m$ is coupled to a tank $1p$ for storing a suspension, and the second nozzle in is coupled to a tank $1q$ for storing a coating material. Each tank is provided with a pump (not shown in the drawing) for discharging the suspension or the coating material.

The size of the first nozzle $1m$ is 10 to 500 μm, and preferably, is 40 to 200 μm. On the other hand, the size of the second nozzle in is 0.1 to 5 μm, and preferably, is 0.1 to 2 μm. The size of the microcapsule to be formed is controlled at a desired particle diameter by the sizes of the first nozzle $1m$ and the second nozzle $1n$. The particle diameter of the microcapsule prepared in the present embodiment is 10 to 500 μm, and preferably, is 40 to 200 μm.

Figure 7A:
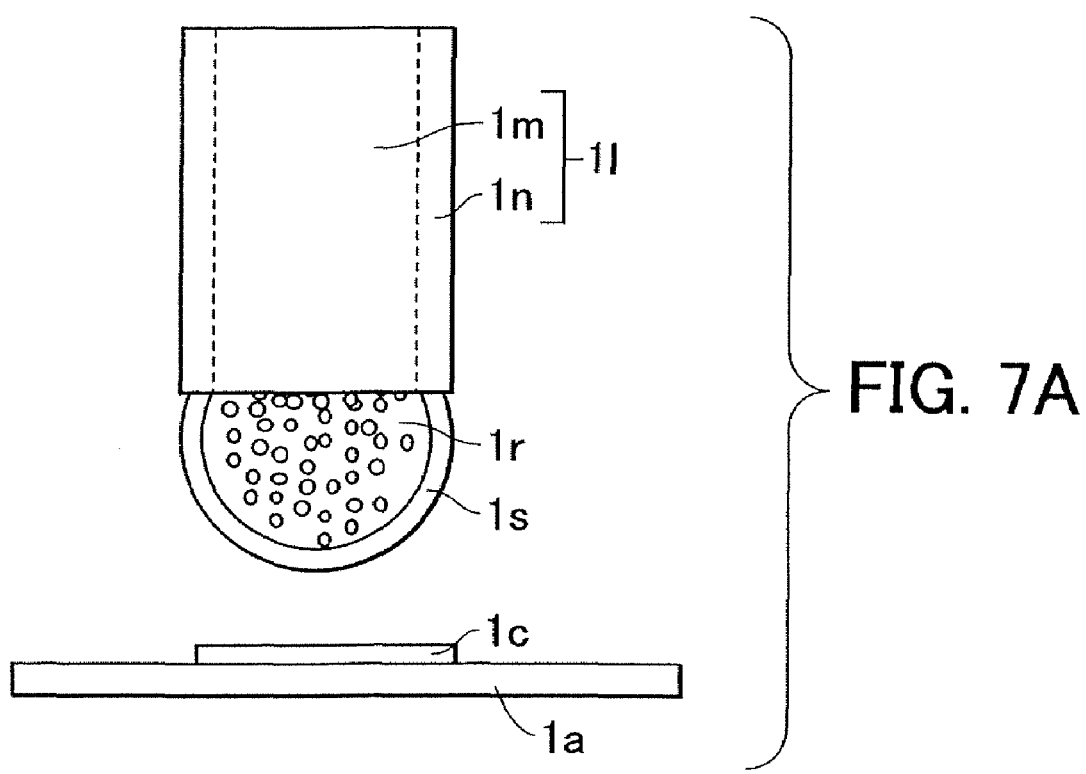
FIGS. 7A and 7B are schematic diagrams showing a forming process of a microcapsule by using a multi-nozzle.
Figure 7B:
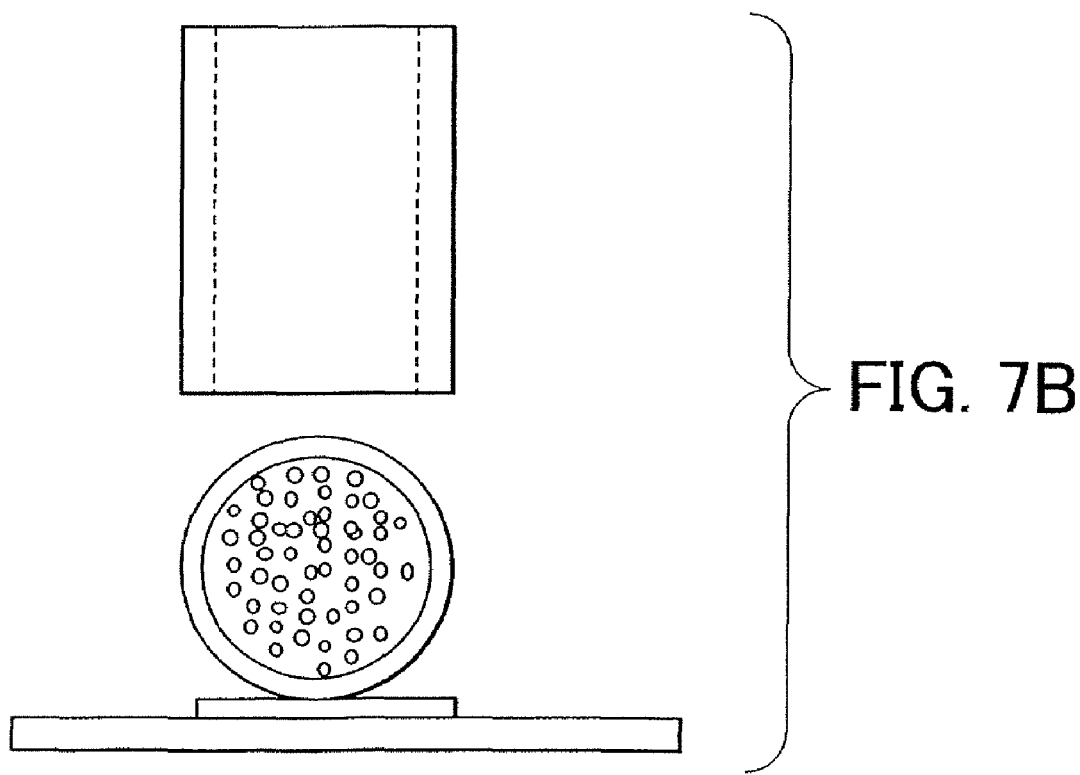

As is shown by schematic diagrams in FIGS. 7A and 7B, a suspension $1r$ containing the electrophoretic particles and the dispersion medium is discharged from the first nozzle $1m$, a coating material $1s$ for covering the suspension $1r$ is discharged from the second nozzle $1n$, and therefore, a microcapsule, which is the coated suspension $1r$, is formed, and is arranged in a desired location on the substrate provided with an electrode.

When the microcapsules $1e$, $1f$ and $1g$ are formed, the multi-nozzle $1l$ may be vertically vibrated so as to control the ejection amounts of the suspension $1r$ and the coating material $1s$.

Furthermore, in order to accurately control the discharge amounts of the suspension $1r$ and the coating material $1s$, a discharge control device $1o$ is provided at the tip of the multi-nozzle $1l$ (FIG. 6A). As the discharge control device $1o$, a piezoelectric-crystal element, a heat-foaming element or the like can be used. The discharge amounts of the suspension $1r$ and the coating material $1s$ are controlled by each of the pumps (not shown in the drawing) provided for the tank $1p$ and the tank $1q$ and the discharge control device $1o$ provided for the multi-nozzle $1l$, and therefore, microcapsules having a uniform particle diameter can be formed.

When the microcapsules $1e$, $1f$ and $1g$ are arranged in desired locations on the electrode substrate, the arrangement of the microcapsules may be performed while a voltage is applied to the first electrode $1c$.

Figure 8A:
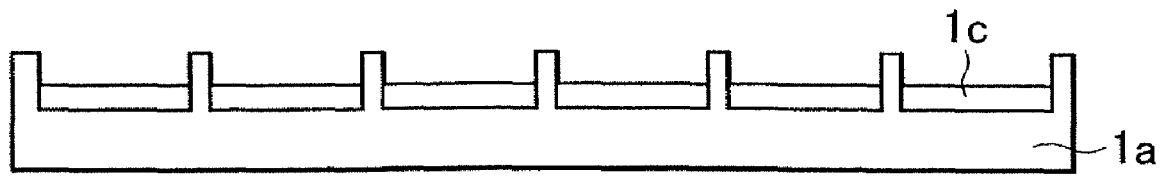
FIGS. 8A and 8B are diagrams showing an example of the shape of projections and depressions formed on a substrate.
Figure 8B:
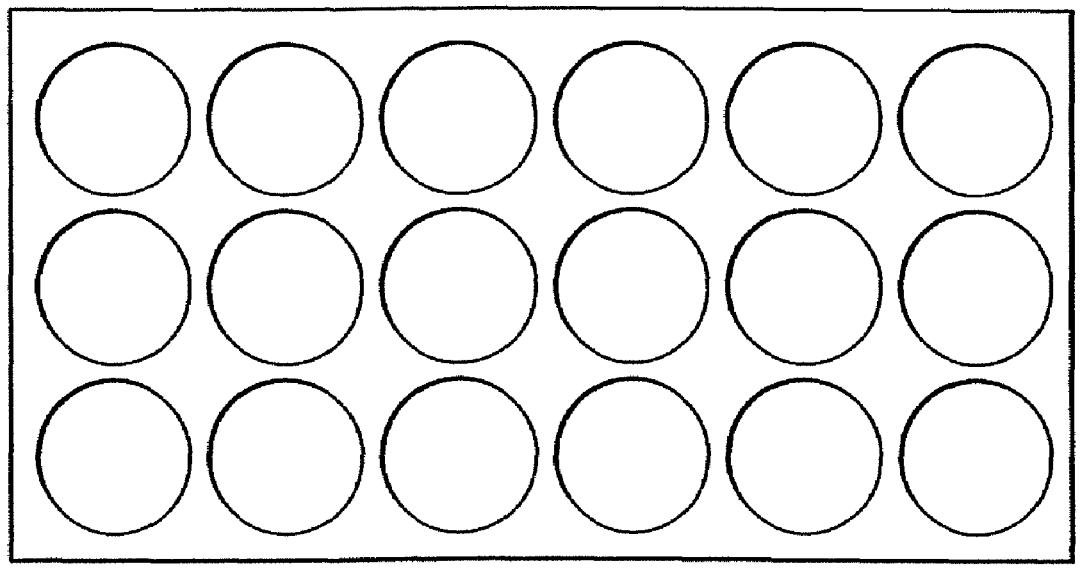

When the microcapsules $1e$, $1f$ and $1g$ are arranged in desired locations on the electrode substrate, the shape of projections and depressions shown in FIGS. 8A and 8B may be formed by patterning on the substrate in advance, and microcapsules may be arranged therein. FIGS. 8A and 8B are diagrams showing an example of the shape of projections and depressions. FIG. 8A shows a sectional view, and FIG. 8B shows a top view. However, the shape of projections and depressions formed on the substrate is not limited to that shown in FIGS. 8A and 8B.

In three types of tank 1p, the white electrophoretic particles 1i are in the condition of being dispersed in the dispersion media 1h, 1j and 1k colored Y, M and C, respectively.

Examples of applicable dispersion media include clear, colorless liquids having a highly insulating property, for example, aromatic hydrocarbons, e.g. toluene, xylene, ethylbenzene and dodecylbenzene, aliphatic hydrocarbons, e.g. hexane, cyclohexane, kerosene, normal paraffin and isoparaffin, halogenated hydrocarbons, e.g. chloroform, dichloromethane, pentachloroethane, 1,2-dibromoethane, 1,1,2,2-tetrabromoethane, trichloroethylene, tetrachloroethylene, trifluoroethylene and tetrafluoroethylene, and various natural or synthetic oil. A mixture of at least two of them may be used. The dispersion medium may contain a charge adjustor, a dispersing agent, a lubricant, a stabilizer and the like on an as needed basis.

Oil-soluble dyes for Y, M or C can be used to color the dispersion medium Y, M, or C. In order to prepare dispersion media of other three primary colors, red (R), green (G) and blue (B), oil-soluble dyes for R, G and B can be used. Preferable examples of these oil-soluble dyes include, for example, azo dyes, anthraquinone dyes, quinoline dyes, nitro dyes, nitroso dyes, penoline dyes, phthalocyanine dyes, metal complex salt dyes, naphthol dyes, benzoquinone dyes, cyanine dyes, indigo dyes and quinonimine dyes. These may be used in combination.

Specific examples of oil-soluble dyes include, for example, Valifast Yellow (1101, 1105, 3108, 4120), Oil Yellow (105, 107, 129, 3G, GGS), Valifast Red (1306, 1355, 2303, 3304, 3306, 3320), Oil Pink 312, Oil Scarlet 308, Oil Violet 730, Valifast Blue (1501, 1603, 1605, 1607, 2606, 2610, 3405), Oil Blue (2N, BOS, 613), Macrorex Blue RR, Sumiplast Green G and Oil Green (502, BG). Preferably, the concentration of the oil-soluble dye is 0.3 to 3.5% by mass.

As white particles, titanium oxide, aluminum oxide, zinc oxide, lead oxide, tin oxide and the like can be used. As black particles, carbon black, diamond black, aniline black, manganese ferrite black, cobalt ferrite black and the like can be used. The surfaces of the particles may be covered with a known charge control resin (CCR) so as to use as the electrophoretic particles 1i. Regarding the size of the electrophoretic particles, preferably, the particle diameters are 0.1 to 10 μm, and more preferably, are 0.2 to 6 μm. Preferably, the concentration of the electrophoretic particles 1i is 3 to 30% by mass.

The coating material is stored in the tank 1q, and may contain a surfactant on an as needed basis. Preferably, the surfactant is a macromolecular surfactant, and for example, poly(styrene-maleic anhydride), poly(ethylene-maleic anhydride) and the like can be used. Preferably, the concentration of the surfactant is 1 to 10% by mass.

As the coating material for constituting the microcapsule, a clear, colorless material which can coat the suspension and which sufficiently passes light can be mentioned, and thermosetting polymers and UV-curing polymers, for example, can be used. The thermosetting polymer is a water-soluble prepolymer before curing, and becomes a water-insoluble polymer when cured by heating through infrared-ray irradiation and the like. As the thermosetting prepolymer, water-soluble prepolymers, e.g. methylol of urea-formaldehyde and methylol of melamine-formaldehyde, can be used. The UV-curing polymer before curing is a water-soluble prepolymer, and becomes a water-insoluble polymer when cured by UV irradiation. As the UV-curing polymer, water-soluble prepolymers, e.g. urethane acrylate, ester acrylate and melamine acrylate, can be used. UV-curing prepolymer may contain a photopolymerization initiator and the like on an as needed basis. Preferably, the concentration of the coating material is 70 to 90% by mass. When a heat-foaming element is used as the discharge control device 1o, preferably, the coating material is a UV-curing polymer.

Regarding curing of the coating material of the microcapsule, all of the microcapsules may be formed on the substrate, and thereafter, the coating materials thereof may be cured by one operation. The microcapsules may successively be formed on the substrate while the coating materials thereof may successively be cured.

In the above-mentioned present embodiment, the multi-nozzle 1l was a concentric double-circle nozzle. However, a concentric multi-circle nozzle, e.g. a concentric triple-circle nozzle, may be used. For example, when the concentric triple-circle nozzle is used, a suspension containing electrophoretic particles and a dispersion medium is discharged from an inner tube of the concentric triple-circle nozzle, an aqueous solution containing a surfactant is discharged from an intermediate tube, and a coating material for covering the suspension and the surfactant is discharged from an outer tube, so that uniform microcapsules 1e, 1f and 1g can be formed in desired locations on the electrode substrate. Furthermore, a linear nozzle provided with a plurality of the above-mentioned concentric multi-circle nozzles may be used.

In order to prevent deviation of the locations of the microcapsules 1e, 1f, and 1g arranged on the substrate, spaces between the microcapsules 1e, 1f, and 1g may be impregnated with a resin binder having a light-transmission property, and therefore, fixation onto the substrate may be performed. Water-soluble polymers can be mentioned as the resin binder having a light-transmission property and, for example, poly(vinyl alcohol)s, polyurethanes, polyesters, acrylic resins and silicone resins can be used.

Figure 5C:
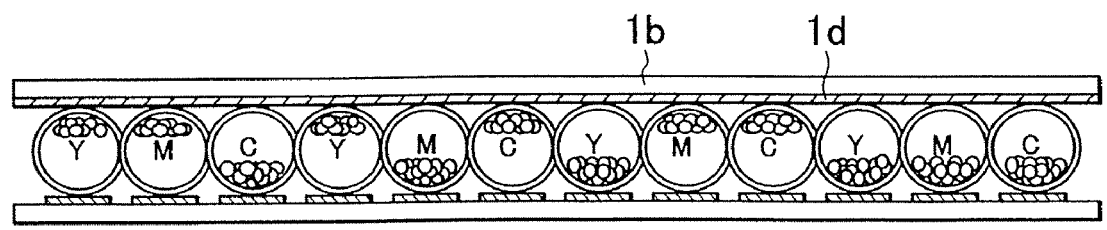

A layer of the microcapsules arranged on the first electrode 1c is covered with the substrate 1b provided with the second electrode 1d, followed by sealing (refer to FIG. 5C).

When the substrate 1a and the substrate 1b are sealed, the substrate 1a and the substrate 1b may be sealed under a pressure in order that spaces between the microcapsules 1e, 1f, and 1g become at a minimum.

The second electrode 1d is a transparent electrode formed in order to cover all the two-dimensionally arranged microcapsules with the same potential, and ITO, an organic conductive film and the like can be used as the electrode material.

The substrate 1b is a display surface of the electrophoretic display element, and the material therefor is not specifically limited as long as it is an insulating transparent member. For example, glass having a light-transmission property, quartz or a plastic film, e.g. polyethylene terephthalate (PET) and poly(ethersulfone) (PES), can be used.

Figure 9A:
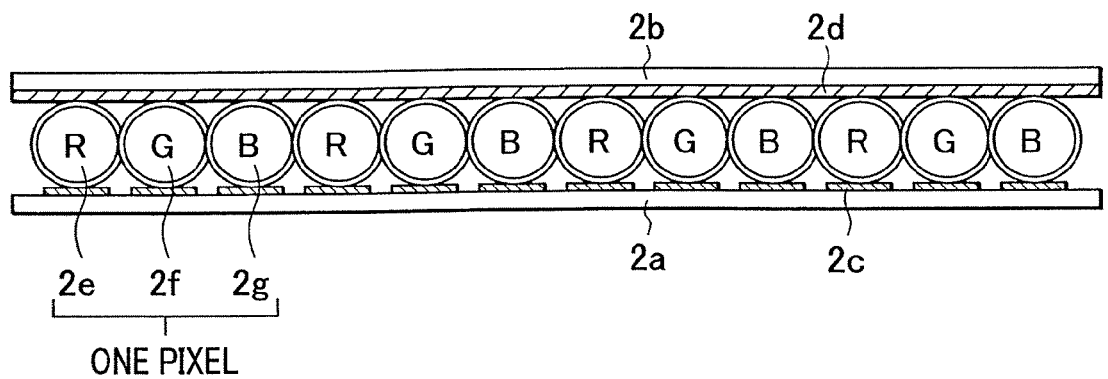
FIG. 9A is a sectional view showing another embodiment of an electrophoretic display element of the present invention.
Figure 9B:
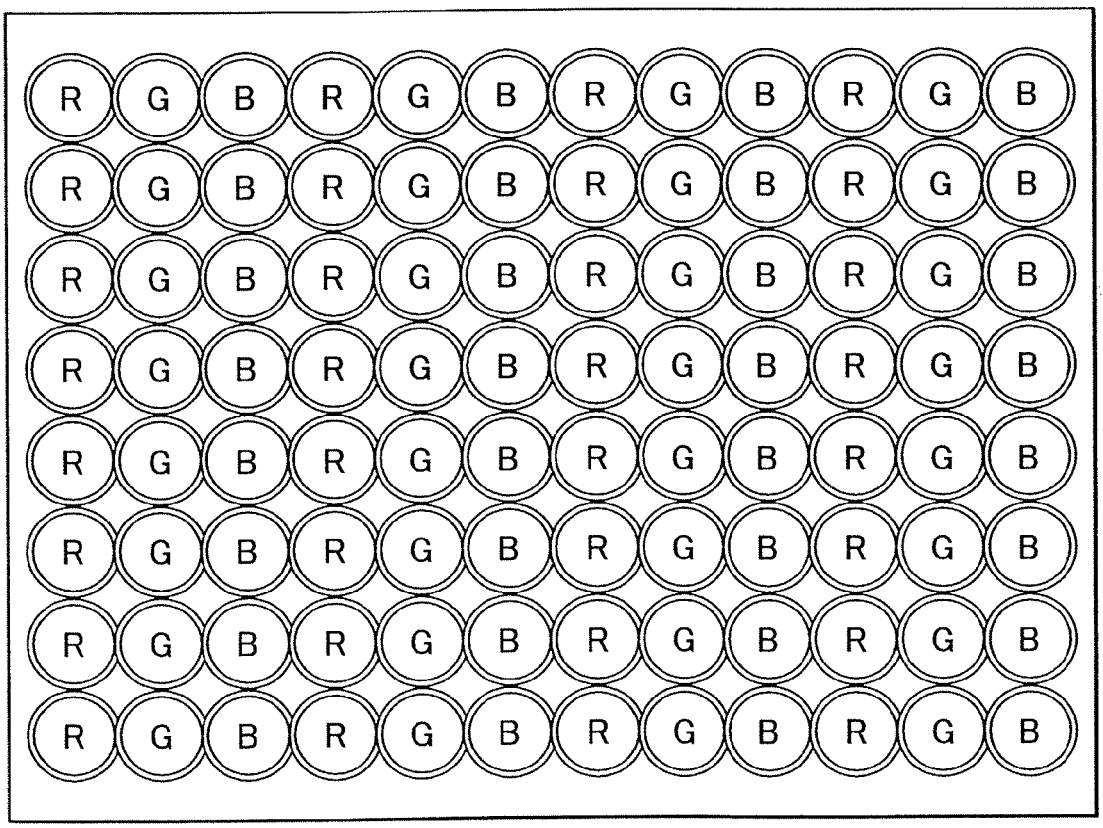
FIG. 9B is a top view.

Another embodiment of the display element of the present invention will be described below. FIGS. 9A and 9B are configuration diagrams showing another embodiment of the electrophoretic display element of the present invention, where a small partition is a microcapsule. FIG. 9A is a sectional view of an electrophoretic display element, and FIG. 9B is a top view schematically showing an arrangement of microcapsules. As shown in FIG. 9A, the electrophoretic display element of the present invention has a structure in which a first electrode 2c and a second electrode 2d are provided on substrates 2a and 2b, respectively, and microcapsules are arranged on the first electrode 2c while being held between the first electrode 2c and the second electrode 2d in a manner similar to that in the above-mentioned FIGS. 1A and 1B. The microcapsule encloses electrophoretic particles colored in one of the three primary colors and another type of electrophoretic particles having a polarity and a color different therefrom in a clear, colorless dispersion medium. Here, three types of microcapsule 2e, 2f, and 2g are arranged, and these microcapsules are differentiated by electrophoretic particles colored red (R), green (G) and blue (B), respectively, hereafter abbreviated as R, G and B. In this electrophoretic display element, the substrate 2b including the second electrode 2d is a display surface. As shown in FIG. 9B, these three types of microcapsule 2e, 2f, and 2g have a uniform particle diameter, and are provided on the first electrode 2c in a two-dimensional arrangement in the row direction and the column direction, as well as in a stripe arrangement in which microcapsules having the same color are aligned in the column direction. The substrate 2b and the second electrode 2d are not shown in FIG. 9B.

In order to prevent deviation of the locations of the microcapsules 2e, 2f, and 2g arranged on the substrate, spaces between the microcapsules 2e, 2f, and 2g may be impregnated with a resin binder having a light-transmission property, and therefore, fixation onto the substrate may be performed.

The first electrode 2c is a pixel electrode capable of independently applying a desired electric field to each microcapsule arranged as shown in FIG. 9B. This pixel electrode is provided with switching elements, a selection signal is applied from a matrix driving circuit, not shown in the drawing, on a row basis, a control signal and an output from a driving transistor are applied to each column, and therefore, a desired electric field can be applied to each of the microcapsules.

Figure 10A:
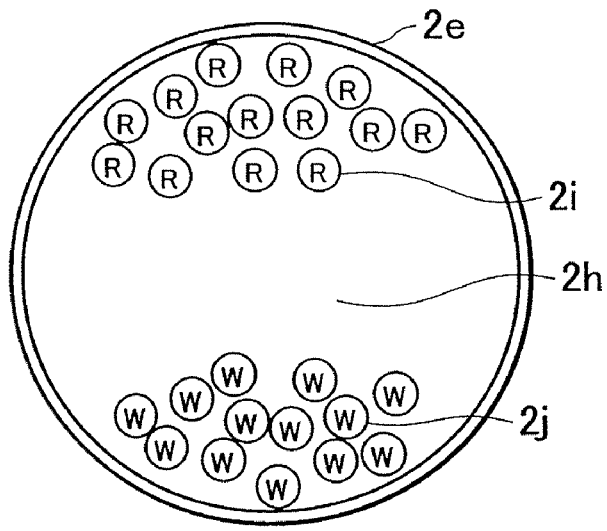
FIGS. 10A to 10C are configuration diagrams of microcapsules in an electrophoretic display element of the present invention.
Figure 10B:
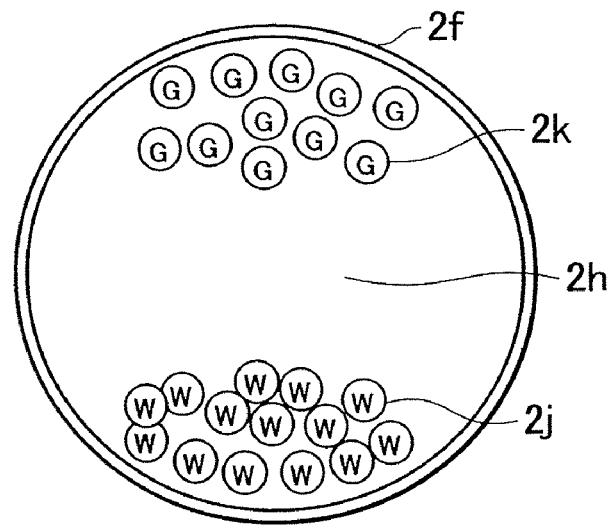
Figure 10C:
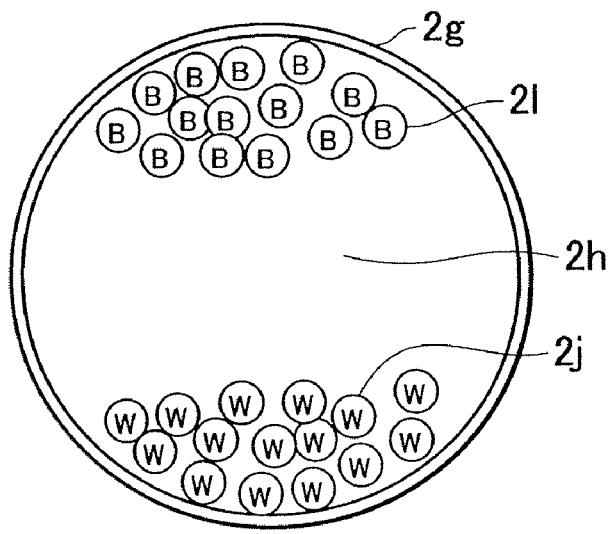

The configurations of the three types of microcapsule are shown in FIGS. 10A to 10C. FIG. 10A is a diagram showing a microcapsule 2e for R, and shows a condition in which electrophoretic particles 2i having a color of R and positive charge and white electrophoretic particles 2j having negative charge are dispersed in a clear, colorless dispersion medium 2h. FIG. 10B is a diagram showing a microcapsule 2f for G, and shows a condition in which electrophoretic particles 2k having a color of G and positive charge and white electrophoretic particles 2j having negative charge are dispersed in a clear, colorless dispersion medium 2h. FIG. 10C is a diagram showing a microcapsule 2g for B, and shows a condition in which electrophoretic particles 2l having a color of B and positive charge and white electrophoretic particles 2j having negative charge are dispersed in a clear, colorless dispersion medium 2h. Although the white electrophoretic particles are shown here, black electrophoretic particles may be used.

Figure 11A:
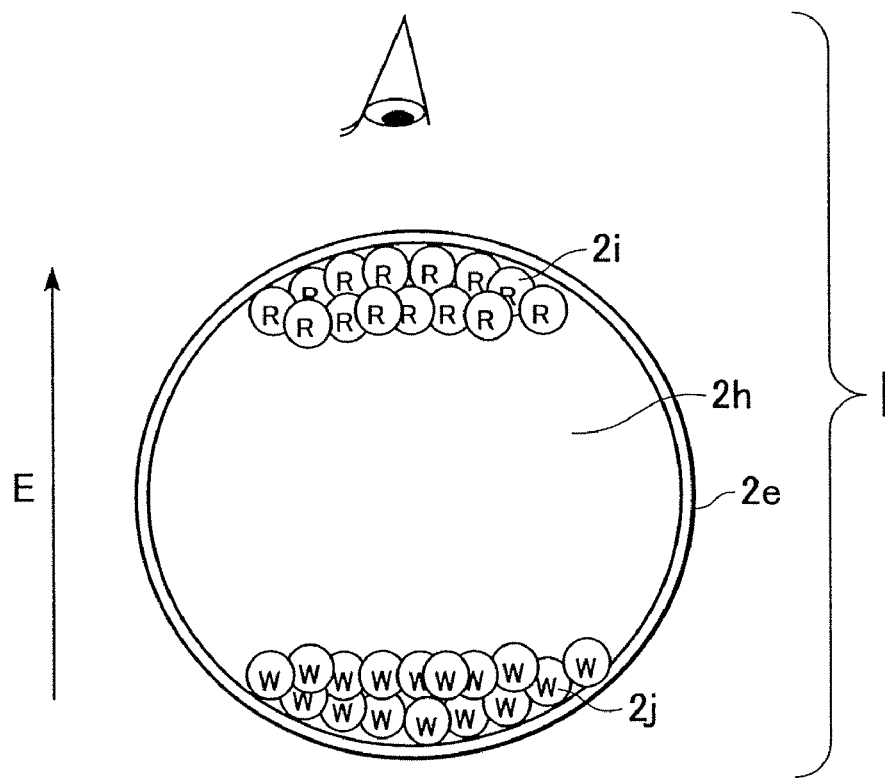
FIGS. 11A and 11B are schematic diagrams showing a displaying method of a microcapsule in an electrophoretic display element of the present invention.
Figure 11B:
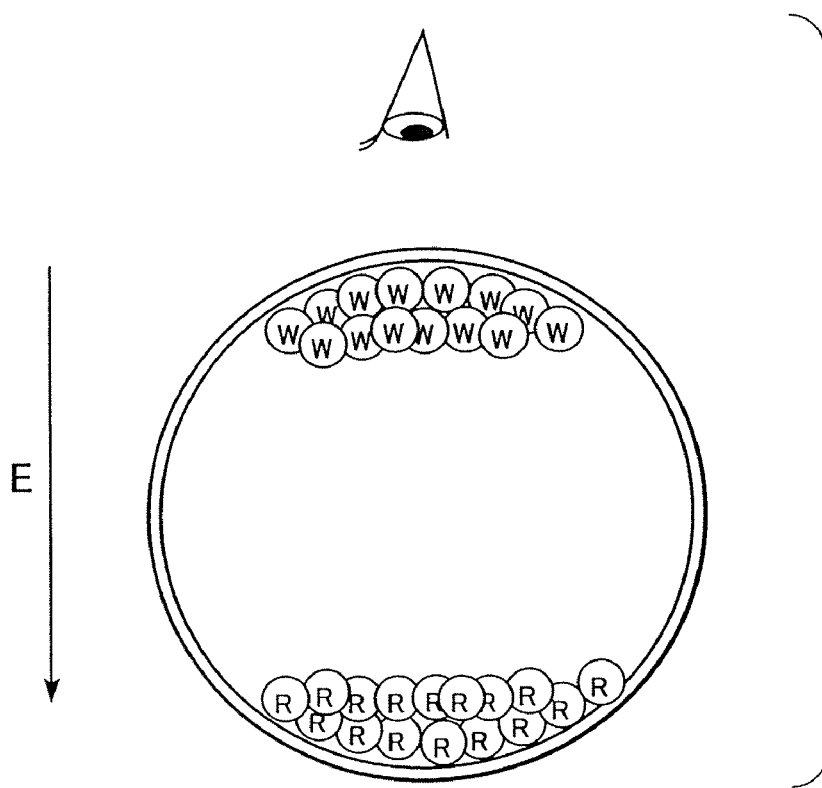

The display of a microcapsule held between electrodes will be described using the microcapsule 2e as an example with reference to FIGS. 11A and 11B. The microcapsule 2e encloses the electrophoretic particles 2i having a color of R and positive charge and the white electrophoretic particles 2j having negative charge dispersed in the clear, colorless dispersion medium 2h. When an electric field E is applied to the microcapsule 2e in the direction indicated by an arrow shown in FIG. 11A, the positively charged electrophoretic particles 2i for R move to the upper side of the capsule, and distribute on the top surface. The negatively charged white electrophoretic particles 2j move to the lower side of the capsule, and distribute on the bottom surface. As a result, when the microcapsule 2e is observed from above, the microcapsule appears to be R due to the distribution of the electrophoretic particles 2i for R. On the other hand, when an electric field E is applied to the microcapsule 2e in the direction indicated by an arrow shown in FIG. 11B, the negatively charged white electrophoretic particles 2j move to the upper side of the capsule, and the positively charged electrophoretic particles 2i for R move to the lower side of the capsule. Consequently, when the microcapsule 2e is observed from above, the microcapsule appears to be white.

In FIGS. 9A and 9B, each microcapsule held between the first electrode 2c and the second electrode 2d is controlled by an electric field applied by the first electrode 2c, and each microcapsule displays the colors of the two types of particles enclosed. The second electrode 2d is a transparent electrode formed in order to cover all the two-dimensionally arranged microcapsules, as shown in FIG. 9B, with the same potential. The three types of microcapsule differentiated by the dispersion media being R, G or B are arranged in a repeated order as RGBRGB in the row direction, as shown in FIG. 9B. The control is performed on the assumption that the display portion of one pixel is composed of successive three types of microcapsule 2e, 2f and 2g described above. High-definition color display can be performed by controlling each pixel.

Figure 12A:
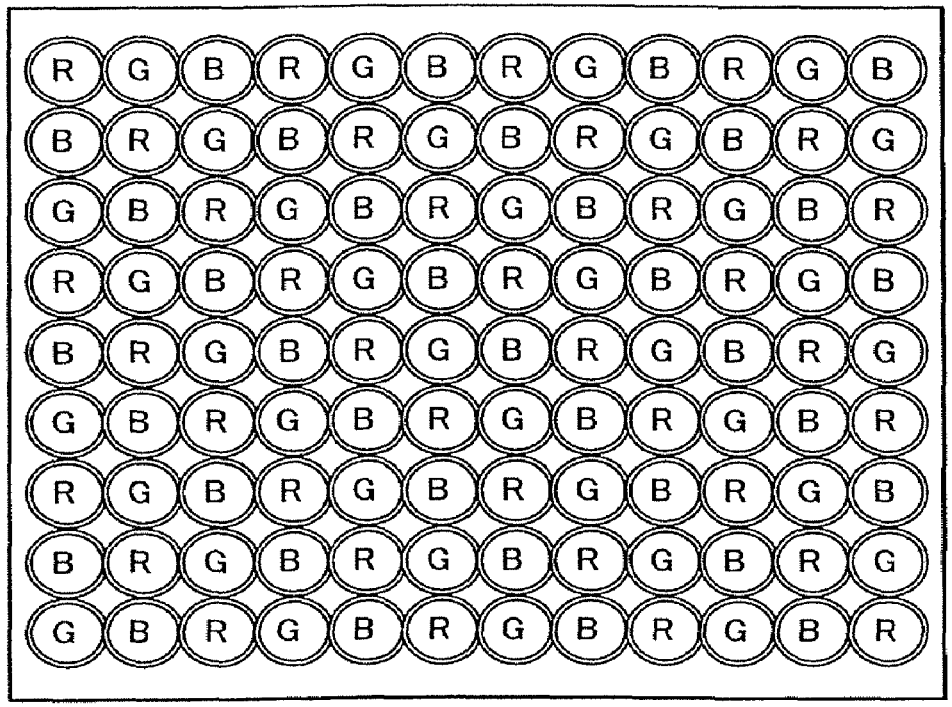
FIG. 12A is a diagram showing a mosaic arrangement of microcapsules.
Figure 12B:
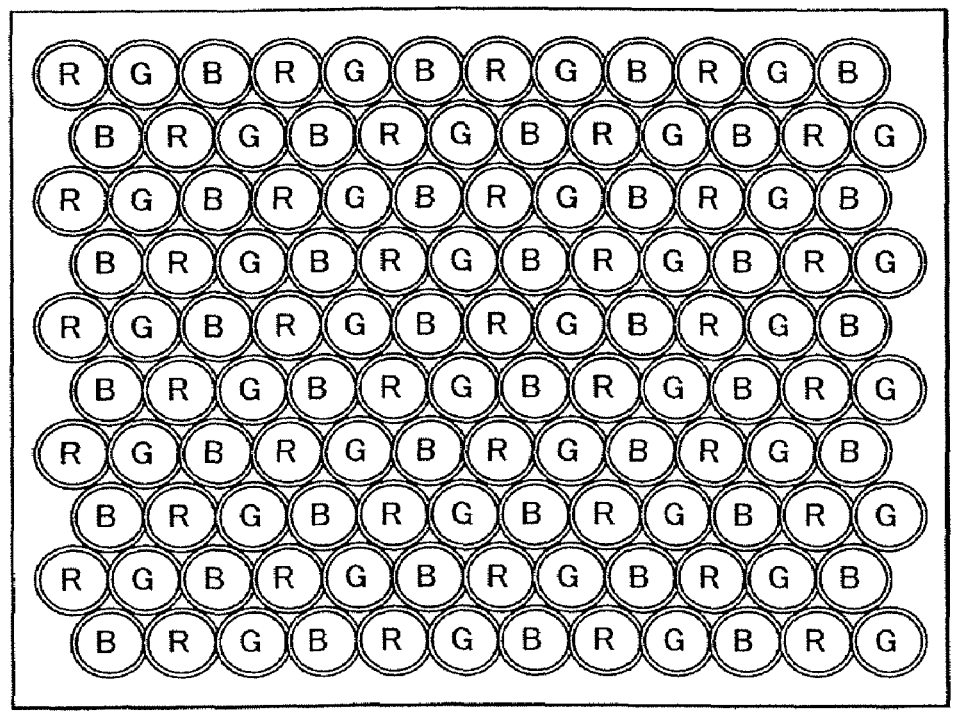
FIG. 12B is a diagram showing a triangular arrangement.

The two-dimensional arrangement of the microcapsules is not limited to the arrangement shown in FIG. 9B, and may be, for example, a mosaic arrangement shown in FIG. 12A and a triangular arrangement shown in FIG. 12B. Likewise, the configuration of the pixel is not limited to the pixel composed of three microcapsules which are three types of microcapsule successively arranged in a row, as in the present embodiment.

The color display was performed using the electrophoretic particles having colors of the three primary colors, R, G, and B in the present embodiment. However, the color display may be performed using the electrophoretic particles having colors of other three primary colors, Y, M and C. The white electrophoretic particles may be changed to black electrophoretic particles so as to use.

A method for manufacturing the present embodiment will be described with reference to FIGS. 13A to 13C. The first electrode 2c for controlling each microcapsule is formed by patterning on the substrate 2a (refer to FIG. 13A).

The substrate 2a is an arbitrary insulating member for supporting the electrophoretic display element, and glass, plastic and the like can be used therefor. The material for the first electrode 2c is not specifically limited, and Al, ITO and the like can be used.

Figure 13A:
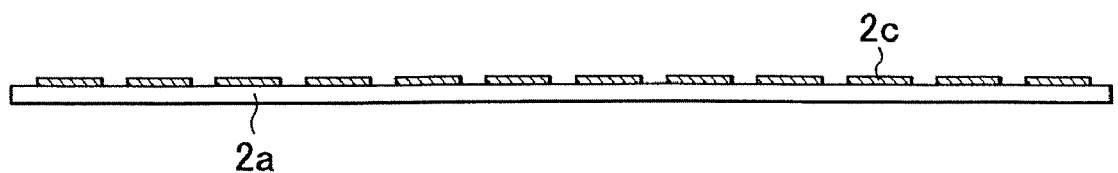
FIGS. 13A to 13C are step diagrams showing an example of a method for manufacturing another embodiment of an electrophoretic display element of the present invention.
Figure 13B:
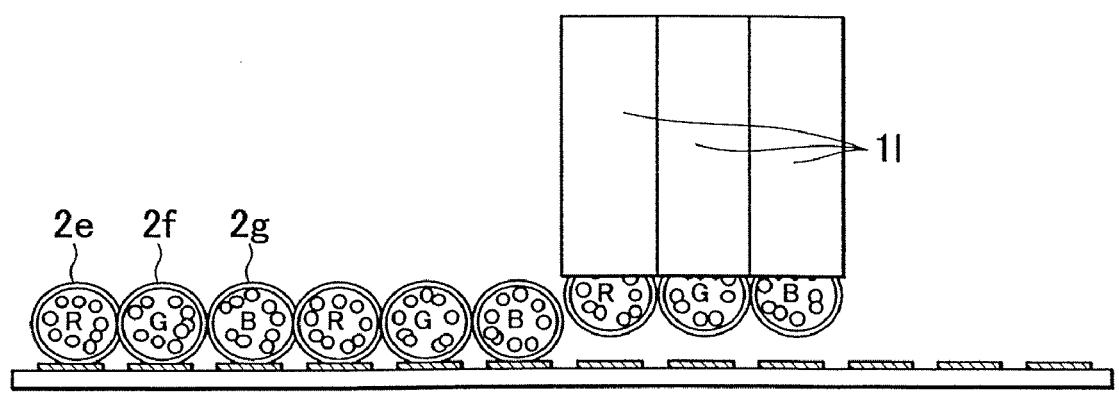

At least three types of multi-nozzle 1l are used, and three types of microcapsule 2e, 2f and 2g enclosing the clear, colorless dispersion medium, the electrophoretic particles 2i, 2k and 2l colored in the three primary colors and another type of electrophoretic particles 2j having a polarity and a color different therefrom are formed in desired locations on the first electrode 2c (refer to FIG. 13B).

As described above, the concentric double-circle nozzle composed of the first nozzle 1m and the second nozzle in (FIGS. 6A and 6B) can be used for the multi-nozzle 1l of the present embodiment. The particle diameter of the microcapsule prepared in the present embodiment is 10 to 500 μm, and preferably, is 40 to 200 μm.

The tank 1p and the tank 1q are coupled to the first nozzle 1m and the second nozzle 1n, respectively. The suspension containing the electrophoretic particles and the dispersion medium is discharged from the first nozzle 1m, and the coating material for covering the suspension is discharged from the second nozzle 1n. Consequently, the microcapsules 2e, 2f and 2g are formed, and are arranged in desired locations on the electrode substrate.

As described above, when the microcapsules 2e, 2f and 2g are formed, the multi-nozzle 1l may be vertically vibrated so as to control the discharge amounts of the suspension and the coating material. Furthermore, the discharge amounts of the suspension and the coating material can be controlled by each of the pumps (not shown in the drawing) provided for the tank 1p and the tank 1q and the discharge control device 1o provided for the multi-nozzle 1l, and therefore, microcapsules having a uniform particle diameter can be formed.

As described above, when the microcapsules 2e, 2f and 2g are arranged in desired locations on the electrode substrate, the arrangement of the microcapsules may be performed while a voltage is applied to the first electrode 2c. When the microcapsules 2e, 2f and 2g are arranged in desired locations on the electrode substrate, the shape of projections and depressions shown in FIGS. 8A and 8B may be formed by patterning on the substrate in advance, and microcapsules may be arranged therein.

In each of three types of tank 1p, a pair of the white electrophoretic particles 2j and one of the electrophoretic particles 2i, 2k and 2l having the color of R, G and B, respectively, are in the condition of being dispersed in the clear, colorless dispersion medium 2h.

As described above, a clear, colorless liquid having a highly insulating property can be used as the dispersion medium 2h. The dispersion medium may contain a charge adjustor, a dispersing agent, a lubricant, a stabilizer and the like on an as needed basis.

Organic pigment particles, inorganic pigment particles and the like, having the colors of R, G and B, can be used as the electrophoretic particles 2i, 2k and 2l having the color of the three primary colors, R, G and B. When color display is performed by electrophoretic particles having the color of other three primary colors, Y, M and C, organic pigment particles, inorganic pigment particles and the like, having the colors of Y, M and C, can be used. Specifically, red pigments, e.g. cadmium red, quinacridone red, lake red, brilliant carmine and madder lake, green pigments, e.g. diamond green lake, phthalocyanine green and pigment green B, blue pigments, e.g. cobalt blue, Victoria blue lake, phthalocyanine blue and fast sky blue, and yellow pigments, e.g. Hansa yellow, cadmium yellow, fast yellow, disazo yellow, titanium yellow, yellow iron oxide and chrome yellow, can be used.

The surface of the particles may be covered with a known charge control resin so as to use as the electrophoretic particles. Regarding the size of the electrophoretic particles, preferably, the particle diameters are 0.1 to 10 µm, and more preferably, are 0.2 to 6 µm. Preferably, the concentration of the electrophoretic particles is 3 to 30% by mass.

As described above, titanium oxide, aluminum oxide, zinc oxide, lead oxide, tin oxide and the like can be used as white particles. Carbon black, diamond black, aniline black, manganese ferrite black and cobalt ferrite black can be used as black particles.

The coating material is stored in the tank 1q, and may contain a surfactant on an as needed basis. As described above, poly(styrene-maleic anhydride), poly(ethylene-maleic anhydride) and the like can be used as the surfactant. Preferably, the concentration of the surfactant is 1 to 10% by mass.

As described above, thermosetting polymers, UV-curing polymers and the like can be used as the coating material for constituting the microcapsule. Preferably, the concentration of the coating material is 70 to 90% by mass.

Regarding curing of the coating material of the microcapsule, as described above, all of the microcapsules may be formed on the substrate, and thereafter, the coating materials thereof may be cured by one operation. The microcapsules may successively be formed on the substrate while the coating materials thereof may successively be cured.

In the above-mentioned present embodiment, the multi-nozzle 1l was a concentric double-circle nozzle. However, a concentric multi-circle nozzle, e.g. a concentric triple-circle nozzle, may be used, as described above. Furthermore, a linear nozzle provided with a plurality of the above-mentioned nozzles may be used.

In order to prevent deviation of the locations of the microcapsules 2e, 2f, and 2g arranged on the substrate, spaces between the microcapsules 2e, 2f, and 2g may be impregnated with a resin binder having a light-transmission property, and therefore, fixation onto the substrate may be performed. The above-mentioned water-soluble polymers can be used as the resin binder having a light-transmission property.

Figure 13C:
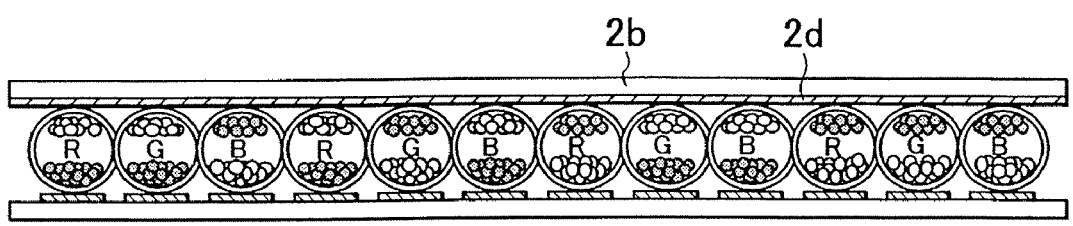

A layer of the microcapsules arranged on the first electrode 2c is covered with the substrate 2b provided with the second electrode 2d, followed by sealing (refer to FIG. 13C).

When the substrate 2a and the substrate 2b are sealed, the substrate 2a and the substrate 2b may be sealed under a pressure in order that spaces between the microcapsules 2e, 2f, and 2g become at a minimum.

The second electrode 2d is a transparent electrode formed in order to cover all the two-dimensionally arranged microcapsules with the same potential, and ITO, an organic conductive film and the like can be used as the electrode material.

The substrate 2b is a display surface of the electrophoretic display element, and the material therefor is not specifically limited as long as it is an insulating transparent member. For example, glass having a light-transmission property, quartz or a plastic film, e.g. polyethylene terephthalate (PET) and poly (ethersulfone) (PES), can be used.

Figure 14A:
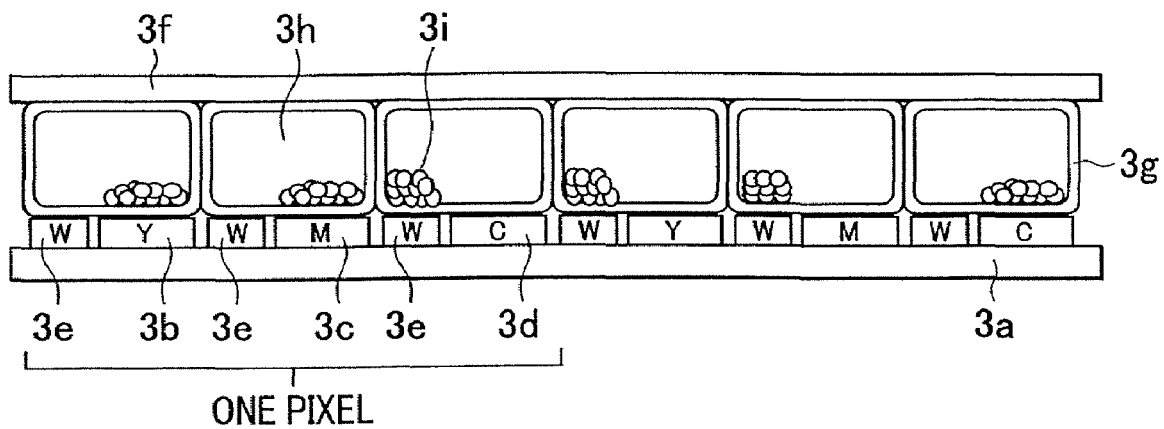
FIG. 14A is a sectional view showing another embodiment of an electrophoretic display element of the present invention.
Figure 14B:
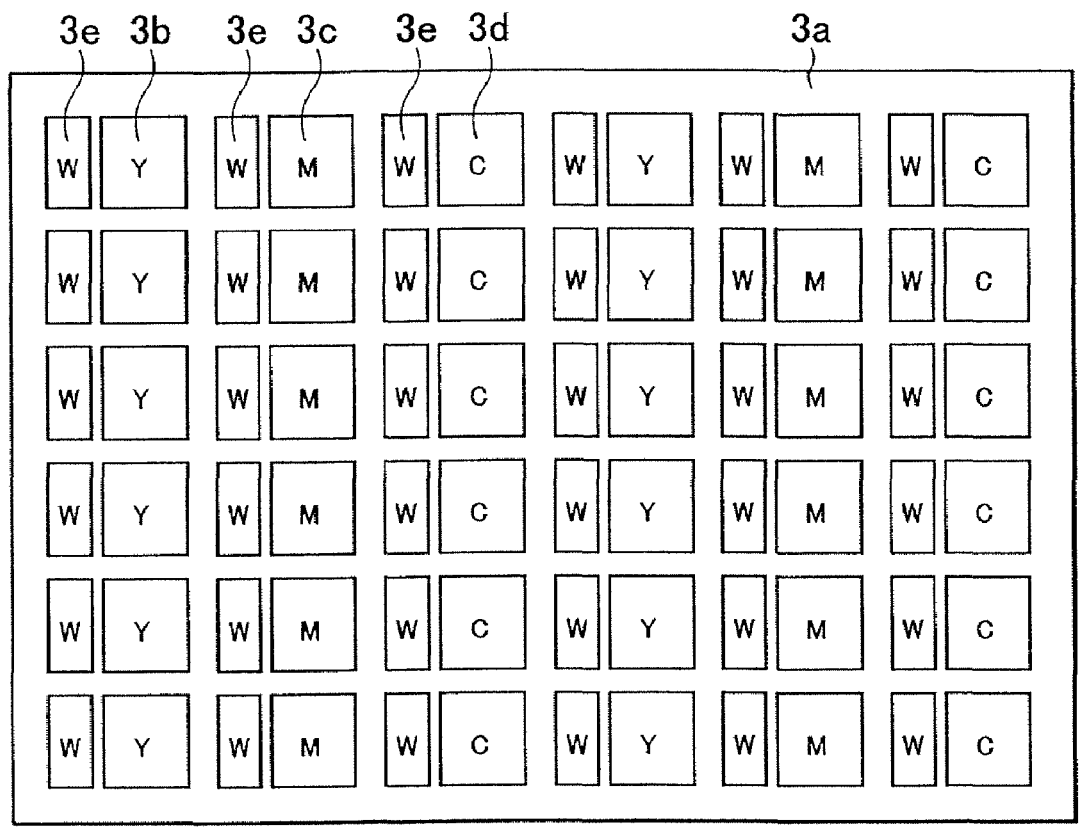
FIG. 14B is a diagram schematically showing an electrode substrate for controlling electrophoretic particles in a microcapsule.

Another embodiment of the display element of the present invention will be described below. FIGS. 14A and 14B are configuration diagrams showing another embodiment of the electrophoretic display element of the present invention, where a small partition is a microcapsule. FIG. 14A is a sectional view of an electrophoretic display element, and FIG. 14B is a diagram schematically showing an electrode substrate for controlling electrophoretic particles in microcapsules. As shown in FIG. 14A, in the electrophoretic display element of the present invention, first electrodes 3b, 3c and 3d and a second electrode 3e are provided on a substrate 3a, and the first electrode 3b is colored Y, the first electrode 3c is colored M, the first electrode 3d is colored C, and the second electrode 3e is colored white. A microcapsule 3g is arranged on the first electrode and the second electrode, and is covered with a protective layer 3f. Regarding the shape of the microcapsule 3g, the length in the horizontal direction is longer than the length in the direction perpendicular to the substrate 3a. The microcapsule 3g encloses a clear, colorless dispersion medium 3h and electrophoretic particles 3i, and the microcapsules 3g are arranged on the first electrodes 3b, 3c and 3d and the second electrode 3e. In this electrophoretic display element, the side provided with the protective layer 3f is a display surface. As shown in FIG. 14B, each of the first electrodes 3b, 3c and 3d is paired up with the second electrode 3e, and pairs are provided in a two-dimensional arrangement in the row direction and the column direction, as well as in a stripe arrangement in which the electrodes having the same color are aligned in the column direction.

In order to prevent deviation of the locations of the microcapsules 3g arranged on the substrate, spaces between the microcapsules 3g may be impregnated with a resin binder having a light-transmission property, and therefore, fixation onto the substrate may be performed.

The first electrodes 3b, 3c and 3d and the second electrode 3e are pixel electrodes capable of independently applying a desired electric field to each microcapsule 3g arranged as shown in FIG. 14A. These pixel electrodes are provided with switching elements, a selection signal is applied from a matrix driving circuit, not shown in the drawing, on a row basis, a control signal and an output from a driving transistor are applied to each column, and therefore, a desired electric field can be applied to each of the microcapsules.

Figure 15A:
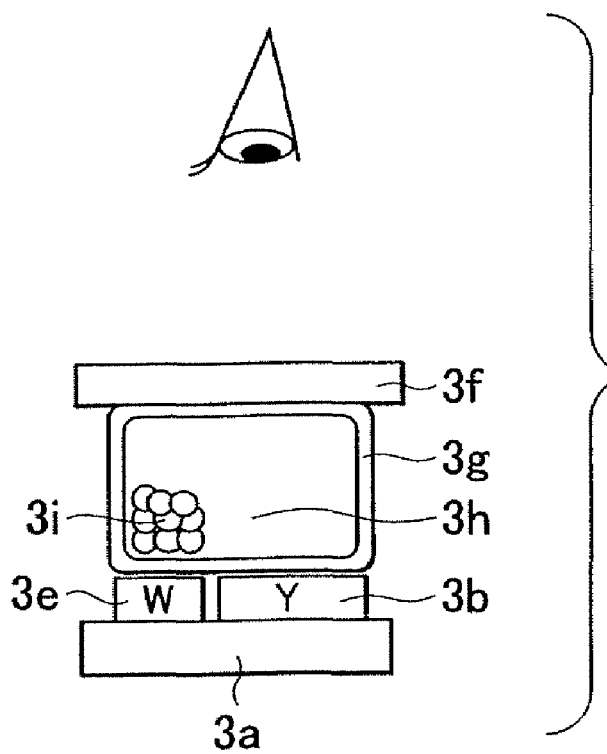
FIGS. 15A and 15B are schematic diagrams showing a displaying method of a microcapsule in an electrophoretic display element of the present invention.
Figure 15B:
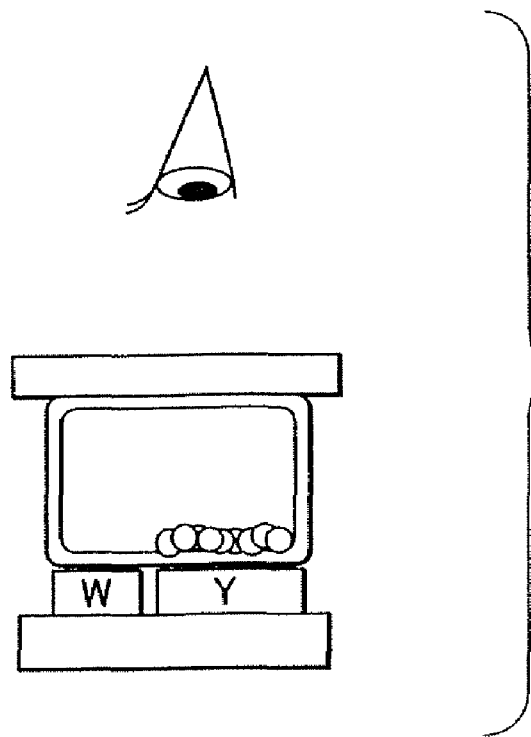

The display of each microcapsule will be described with reference to FIGS. 15A and 15B. The microcapsule 3g encloses the negatively charged white electrophoretic particles 3i in the clear, colorless dispersion medium 3h. Regarding the microcapsule 3g, when the first electrode 3b is negatively charged, and the second electrode 3e is positively charged, the negatively charged white electrophoretic particles 3i move above the second electrode 3e. Consequently, when the microcapsule 3g is observed from above, the microcapsule appears to be Y. On the other hand, when the first electrode 3b is positively charged, and the second electrode 3e is negatively charged, the white particles 3i move above the first electrode 3b. Consequently, when the microcapsule 3g is observed from above, the microcapsule appears to be white. Although explanation was made using the white electrophoretic particles here, black electrophoretic particles may be used. However, in this case, preferably, the second electrode 3e is black.

In FIGS. 14A and 14B, the microcapsules 3g are controlled by electric fields applied by the first electrodes 3b, 3c and 3d and the second electrode 3e, and each microcapsule 3g controls each color of the first electrodes 3b, 3c and 3d and the second electrode 3e by movement of the electrophoretic particles enclosed. The first electrodes 3b, 3c and 3d are arranged in a repeated order as YMCYMC in the row direction, as shown in FIG. 14B. The control is performed on the assumption that the display portion of one pixel is composed of successive pairs of the first electrodes 3b, 3c and 3d and the second electrode 3e described above. High-definition color display can be performed by controlling each pixel.

Figure 16:
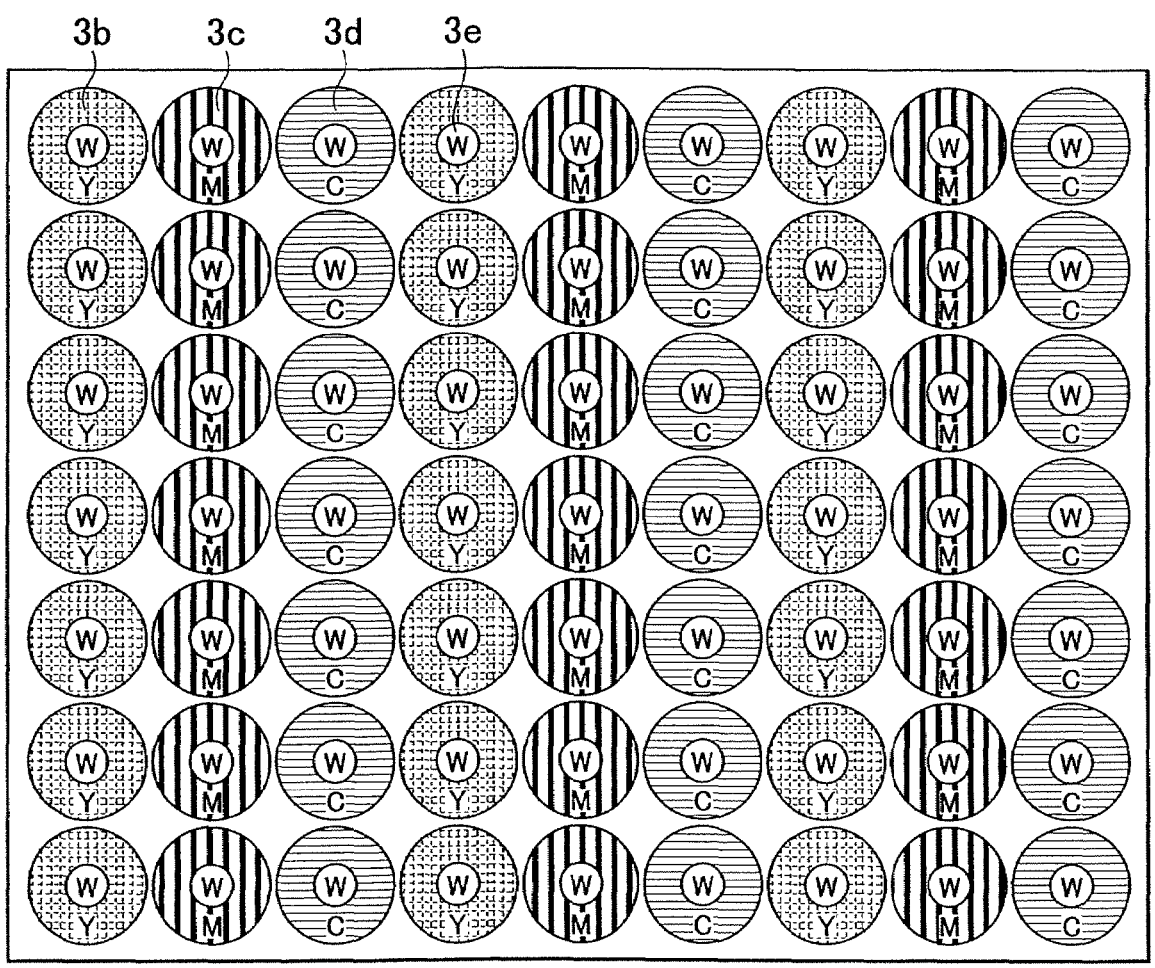
FIG. 16 is a diagram showing dot electrodes as an example of the configuration of a first electrode and a second electrode.

The configuration of the first electrode and the second electrode is not limited to the present embodiment, and may be the dot electrodes shown in FIG. 16. The two-dimensional arrangement thereof is not limited to the arrangement shown in FIGS. 14A, 14B and 16, and may be, for example, the mosaic arrangement shown in FIG. 4A and the triangular arrangement shown in FIG. 4B.

Since display contrast significantly depends on the area ratio of the first electrode to the second electrode, the area of the second electrode must be reduced relative to that of the first electrode in order to increase the contrast. Preferably, the area ratio of the first electrode to the second electrode is in the order of 2:1 to 4:1.

Likewise, the configuration of the pixel is not limited to the pixel composed of three microcapsules provided on the electrodes of Y, M and C, successively arranged in a row, as in the present embodiment.

In the present embodiment, the color display was performed using the electrodes colored Y, M and C as the three primary colors. However, the color display may be performed using the electrodes colored R, G and B as other three primary colors. Although the electrode colored white was used as the second electrode 3e, the color may be black. In that case, black electrophoretic particles are preferable.

A method for manufacturing the present embodiment will be described with reference to FIGS. 17A to 17C. The first electrodes 3b, 3c and 3d and the second electrode 3e, for controlling each microcapsule, are formed by patterning on the substrate 3a, and furthermore, color filters for Y, M and C are provided on the first electrodes 3b, 3c and 3d, and the second electrode 3e is provided with a white color filter (refer to 17A).

The substrate 3a is an arbitrary insulating member for supporting the electrophoretic display element, and glass, plastic and the like can be used therefor. The material for the first electrodes 3b, 3c and 3d and the second electrode 3e is not specifically limited, and ITO, Al and the like can be used.

Color resists of Y, M and C can be used as the color filters for Y, M and C, and an acrylic resin containing alumina fine particles or titania fine particles can be used for a white filter. When color display is performed using other three primary colors, R, G and B, the first electrodes 3b, 3c and 3d may be constructed by providing color filters for R, G and B on ITO electrodes formed by patterning.

Figure 17A:
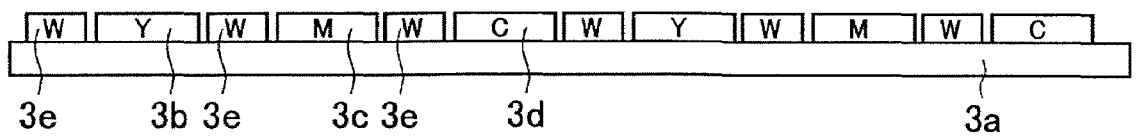
FIGS. 17A to 17C are step diagrams showing an example of a method for manufacturing another embodiment of an electrophoretic display element of the present invention.
Figure 17B:
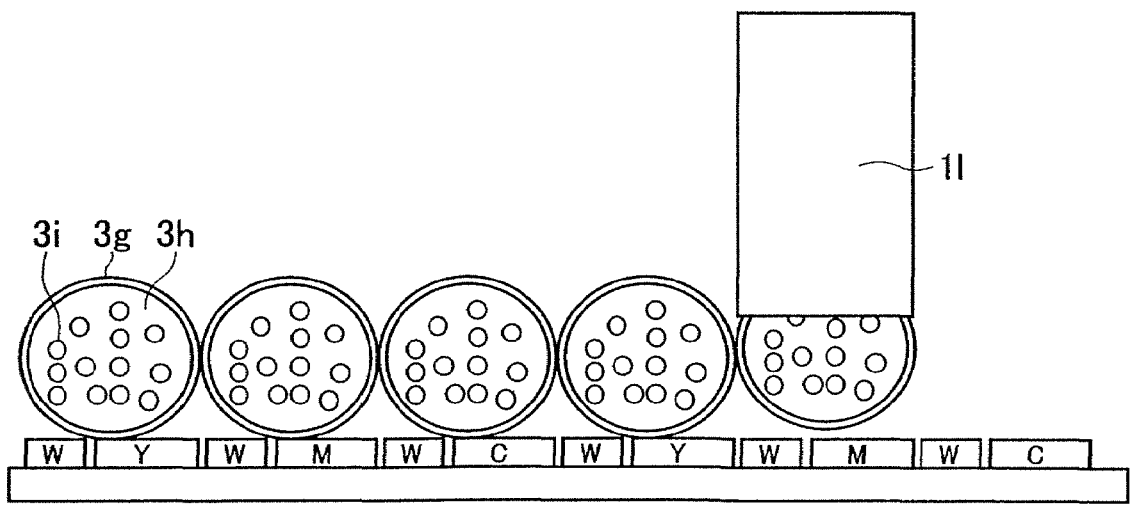

A multi nozzle 1l is used, and microcapsules 3g enclosing the clear, colorless dispersion medium 3h and the electrophoretic particles 3i are formed in desired locations on the first electrodes 3b, 3c and 3d and the second electrode 3e (refer to FIG. 17B).

As described above, the concentric double-circle nozzle composed of the first nozzle 1m and the second nozzle in (FIGS. 6A and 6B) can be used for the multi-nozzle 1l of the present embodiment. The particle diameter of the microcapsule prepared in the present embodiment is 10 to 500 μm, and preferably, is 40 to 200 μm.

The tank 1p and the tank 1q are coupled to the first nozzle 1m and the second nozzle in, respectively. The suspension containing the electrophoretic particles and the dispersion medium is discharged from the first nozzle 1m, and the coating material for covering the suspension is discharged from the second nozzle 1n. Consequently, the microcapsules 3g are formed, and are arranged in desired locations on the electrode substrate.

As described above, when the microcapsules 3g are formed, the multi-nozzle 1l may be vertically vibrated so as to control the discharge amounts of the suspension and the coating material. Furthermore, the discharge amounts of the suspension and the coating material can be controlled by each of the pumps (not shown in the drawing) provided for the tank 1p and the tank 1q and the discharge control device 1o provided for the multi-nozzle 1l, and therefore, microcapsules having a uniform particle diameter can be formed.

Figure 18A:
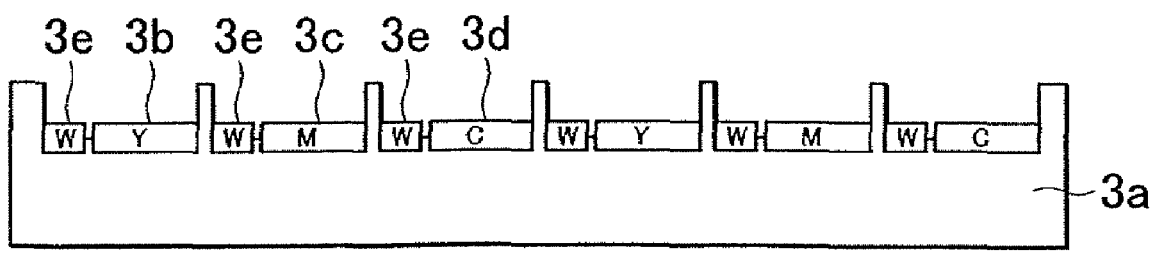
FIGS. 18A and 18B are diagrams showing an example of the shape of projections and depressions formed on a substrate.
Figure 18B:
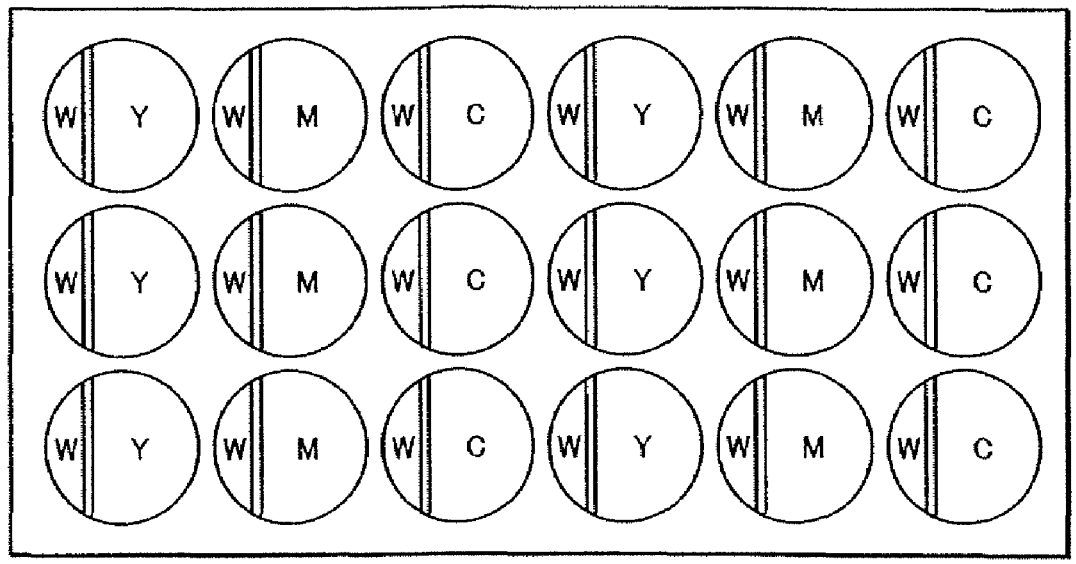

As described above, when the microcapsules 3g are arranged in desired locations on the electrode substrate, the arrangement of the microcapsules may be performed while a voltage is applied to the first electrodes and the second electrode. When the microcapsules 3g are arranged in desired locations on the electrode substrate, the shape of projections and depressions shown in FIGS. 18A and 18B may be formed by patterning on the substrate in advance, and microcapsules may be arranged therein. FIGS. 18A and 18B show an example of the shape of projections and depressions, FIG. 18A shows a sectional view, and FIG. 18B shows a top view. However, the shape of projections and depressions formed on the substrate is not limited to that shown in FIGS. 18A and 18B.

In the tank 1p, the white electrophoretic particles 3i are in the condition of being dispersed in the clear, colorless dispersion medium 3h. As described above, a clear, colorless liquid having a highly insulating property can be used as the dispersion medium 3h. The dispersion medium may contain a charge adjustor, a dispersing agent, a lubricant, a stabilizer and the like on an as needed basis.

As described above, titanium oxide, aluminum oxide, zinc oxide, lead oxide, tin oxide and the like can be used as white particles. Carbon black, diamond black, aniline black, manganese ferrite black and cobalt ferrite black can be used as black particles. Regarding the size of the electrophoretic particles, preferably, the particle diameters are 0.1 to 10 μm, and more preferably, are 0.2 to 6 μm. Preferably, the concentration of the electrophoretic particles is 1 to 10% by mass.

The coating material is stored in the tank 1q, and may contain a surfactant on an as needed basis. As described above, poly(styrene-maleic anhydride), poly(ethylene-maleic anhydride) and the like can be used as the surfactant. Preferably, the concentration of the surfactant is 1 to 10% by mass.

As described above, thermosetting polymers, UV-curing polymers and the like can be used as the coating material for constituting the microcapsule. Preferably, the concentration of the coating material is 70 to 90% by mass.

Regarding curing of the coating material of the microcapsule, as described above, all of the microcapsules may be formed on the substrate, and thereafter, the coating materials thereof may be cured by one operation. The microcapsules may successively be formed on the substrate while the coating materials thereof may successively be cured.

In the above-mentioned present embodiment, the multi-nozzle 1$l$ was a concentric double-circle nozzle. However, a concentric multi-circle nozzle, e.g. a concentric triple-circle nozzle, may be used, as described above. Furthermore, a linear nozzle provided with a plurality of the above-mentioned nozzles may be used.

In order to prevent deviation of the locations of the microcapsules 3$g$ arranged on the substrate, spaces between the microcapsules 3$g$ may be impregnated with a resin binder having a light-transmission property, and therefore, fixation onto the substrate may be performed. The above-mentioned water-soluble polymers can be used as the resin binder having a light-transmission property.

Figure 17C:
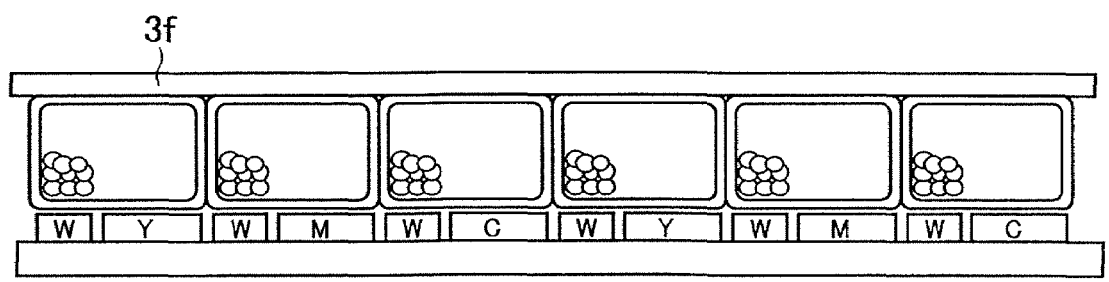

A layer of the microcapsules 3$g$ arranged on the first electrodes 3$b$, 3$c$ and 3$d$ and the second electrode 3$e$ is covered with the protective layer 3$f$, and the substrate 3$a$ and the protective layer 3$f$ are sealed under a pressure in order that, regarding the shape of the microcapsule 3$g$, the length in the horizontal direction is longer than the length in the direction perpendicular to the substrate 3$a$ (refer to FIG. 17C).

The protective layer 3$f$ is a display surface of the electrophoretic display element. The material therefor is not specifically limited as long as it is an insulating transparent member, and glass, plastic and the like can be used.

In the display element having a configuration in which a pair of electrodes are provided on the substrate 3$a$, since the electrophoretic particles are driven in the horizontal direction relative to the substrate through the use of a leakage electric field between the electrodes, the contrast is significantly low when a spherical microcapsule is used. However, high-contrast, high-definition color display can be performed when the microcapsule has the shape according to the present invention.

Figure 19A:
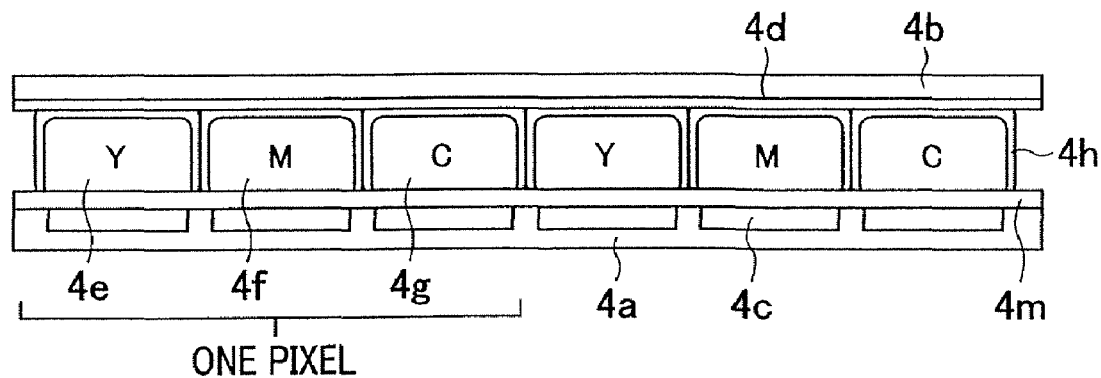
FIG. 19A is a sectional view showing another embodiment of an electrophoretic display element of the present invention.
Figure 19B:
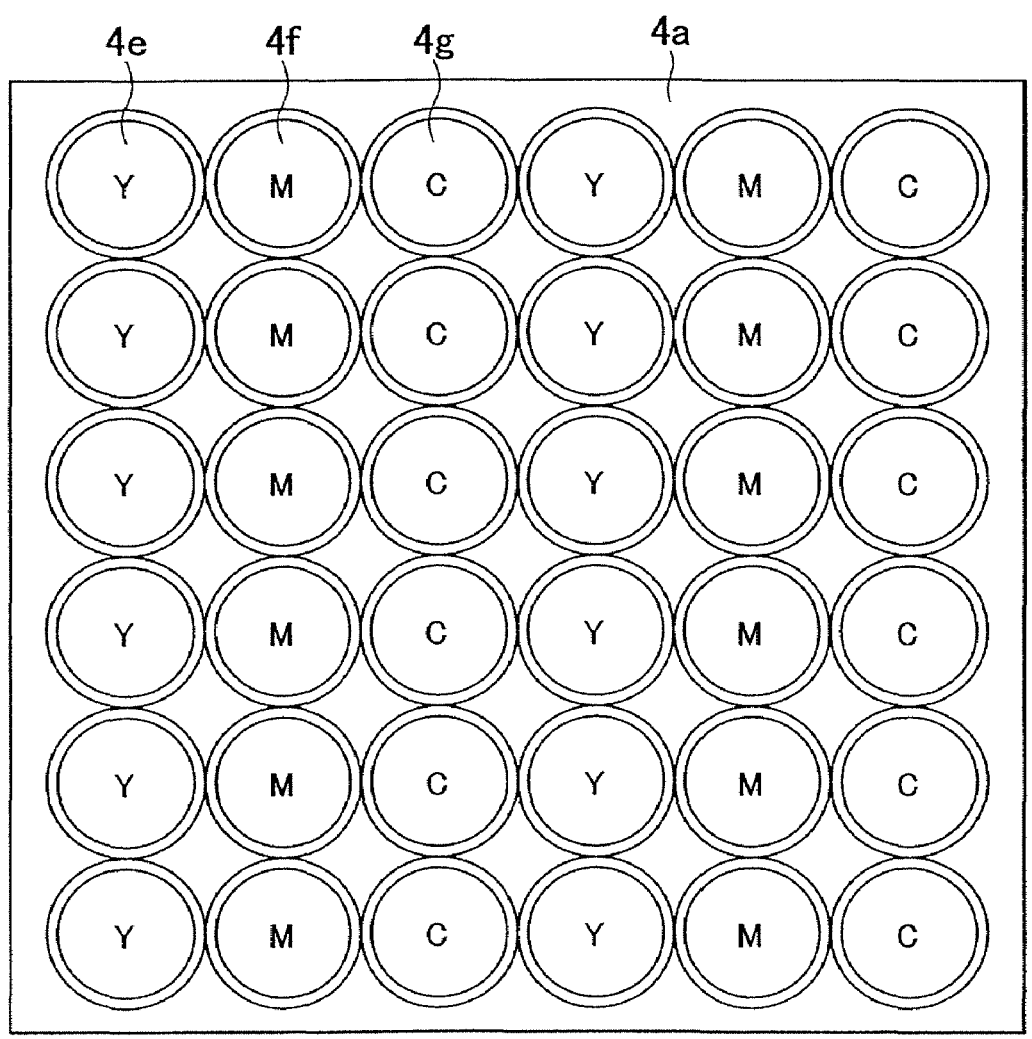
FIG. 19B is a top view.

Another embodiment of the display element of the present invention will be described below. FIGS. 19A and 19B are configuration diagrams showing another embodiment of the electrophoretic display element of the present invention, where a small partition is a closed space composed of a substrate and a coating material. Hereafter this closed space is referred to as a microdome. FIG. 19A is a sectional view of an electrophoretic display element, and FIG. 19B is a top view schematically showing the arrangement of microdomes. As shown in FIG. 19A, in the electrophoretic display element of the present invention, a first electrode 4$c$ and a second electrode 4$d$ are provided on a substrate 4$a$ and a substrate 4$b$, respectively. The microdome is provided on the first electrode 4$c$ with an insulating layer 4$m$ therebetween. The microdome is deformed by the substrate 4$b$ having the second electrode 4$d$, and thereby, a space between the microdomes is reduced, regarding the structure. The microdome encloses a dispersion medium colored in one of the three primary colors and electrophoretic particles having the color different from the three primary colors. Here, three types of microdome 4$e$, 4$f$ and 4$g$ are provided, and are differentiated by the dispersion media colored Y, M and C, respectively.

The substrate 4$b$ having the second electrode 4$d$ is a display surface of this electrophoretic display element. As shown in FIG. 19B, these three types of microdome 4$e$, 4$f$ and 4$g$ have a uniform shape, and are provided on the first electrode 4$c$ in a two-dimensional arrangement in the row direction and the column direction, as well as in a stripe arrangement in which the microdomes having the same color are aligned in the column direction. The substrate 4$b$ and the second electrode 4$d$ are not shown in FIG. 19B.

In order to prevent deviation of the locations of the microdomes 4$e$, 4$f$ and 4$g$ arranged on the substrate, spaces between the microdomes 4$e$, 4$f$ and 4$g$ may be impregnated with a resin binder having a light-transmission property, and therefore, fixation onto the substrate may be performed.

The first electrode 4$c$ is a pixel electrode capable of independently applying a desired electric field to each of the microdomes 4$e$, 4$f$ and 4$g$ arranged as shown in FIG. 19B. This pixel electrode is provided with switching elements, a selection signal is applied from a matrix driving circuit, not shown in the drawing, on a row basis, a control signal and an output from a driving transistor are applied to each column, and therefore, a desired electric field can be applied to each of the microdomes 4$e$, 4$f$ and 4$g$.

Figure 20A:
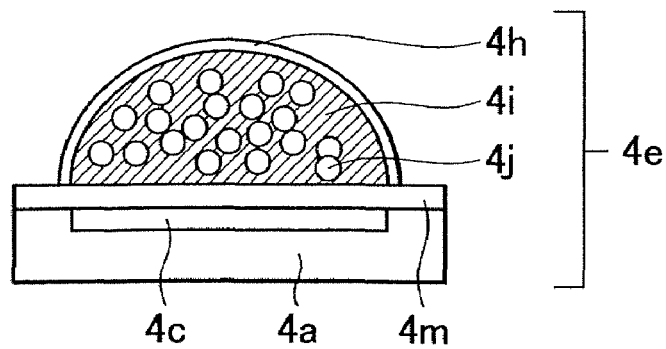
FIGS. 20A to 20C are configuration diagrams of microdomes in an electrophoretic display element of the present invention.
Figure 20B:
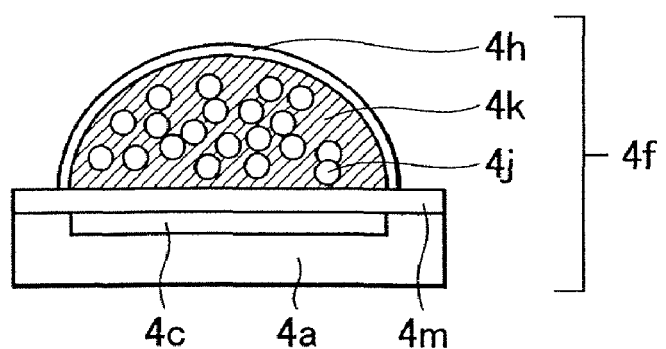
Figure 20C:
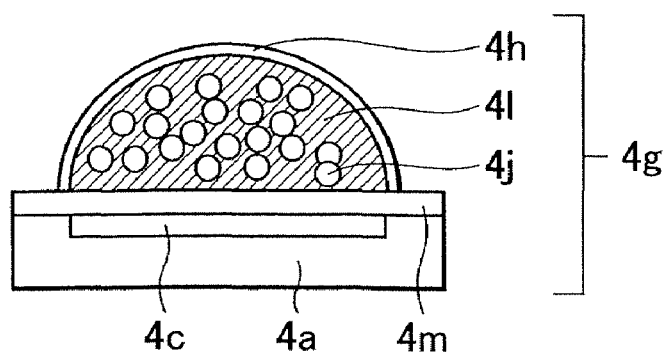

The configurations of the three types of microdome 4$e$, 4$f$ and 4$g$ are shown in FIGS. 20A to 20C. FIG. 20A is a diagram showing the first electrode 4$c$, the substrate 4$a$ having an insulating layer 4$m$ and a microdome 4$e$ formed from a coating material 4$h$, and shows a condition in which white electrophoretic particles 4$j$ are dispersed in a dispersion medium 4$i$ colored Y. FIG. 20B is a diagram showing a microdome 4$f$ for M, and shows a condition in which white electrophoretic particles 4$j$ are dispersed in a dispersion medium 4$k$ colored M. FIG. 20C is a diagram showing a microdome 4$g$ for C, and shows a condition in which white electrophoretic particles 4$j$ are dispersed in a dispersion medium 4$l$ colored C. Although white particles are shown here as electrophoretic particles, black particles may be used.

Figure 21A:
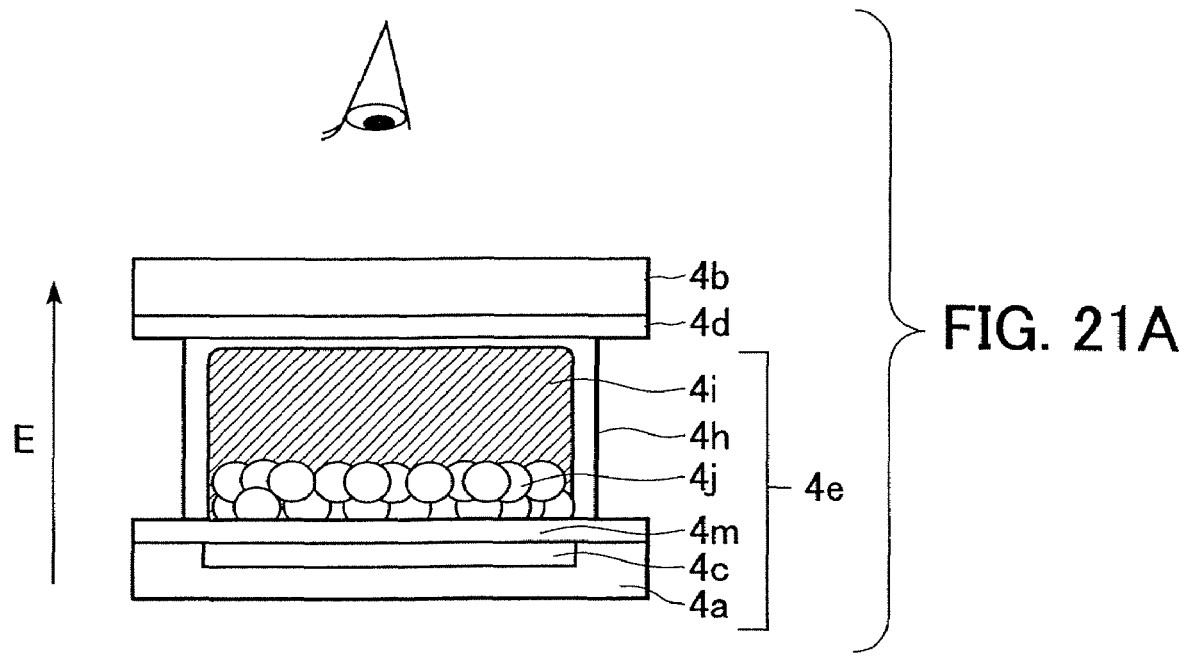
FIGS. 21A and 21B are schematic diagrams showing a displaying method of a microdome in an electrophoretic display element of the present invention.
Figure 21B:
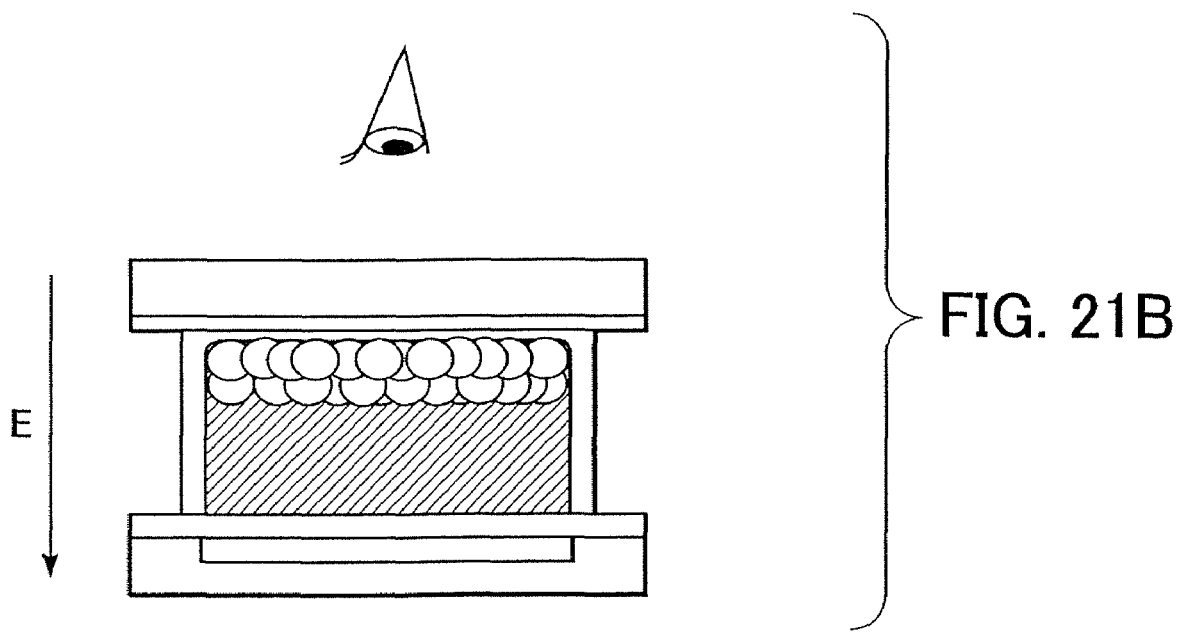

The display of a microdome held between electrodes will be described using the microdome 4$e$ as an example with reference to FIGS. 21A and 21B. The microdome 4$e$ encloses the dispersion medium 4$i$ colored Y and the white electrophoretic particles 4$j$, and it is assumed that the white electrophoretic particles 4$j$ are negatively charged. When an electric field E is applied to the microdome 4$e$ in the direction indicated by an arrow shown in FIG. 21A, the negatively charged white electrophoretic particles 4$j$ move to the lower side of the microdome, and distribute on the bottom surface. As a result, when the microdome 4$e$ is observed from above, the microdome appears to be Y which is the color of the dispersion medium. On the other hand, when an electric field E is applied to the microdome 4$e$ in the direction indicated by an arrow shown in FIG. 21B, the white electrophoretic particles 4$j$ move to the upper side of the microdome, and distribute on the top surface. As a result, when the microdome 4$e$ is observed from above, the microdome appears to be white.

In FIGS. 19A and 19B, each microdome held between the first electrode 4$c$ and the second electrode 4$d$ is controlled by an electric field applied by the first electrode 4$c$, and each microdome displays the colors of the particles and the dispersion medium. The second electrode 4$d$ is a transparent electrode formed in order to cover all the two-dimensionally arranged microdomes, as shown in FIG. 19B, with the same potential. The three types of microdome differentiated by the dispersion media being Y, M or C are arranged in a repeated order as YMCYMC in the row direction, as shown in FIG.

19B. The control is performed on the assumption that the display portion of one pixel is composed of successive three types of microdome 4e, 4f and 4g described above. High-definition color display can be performed by controlling each pixel.

The two-dimensional arrangement of the microdomes is not limited to the arrangement shown in FIG. 19B, and may be, for example, the mosaic arrangement shown in FIG. 4A and the triangular arrangement shown in FIG. 4B. Likewise, the configuration of the pixel is not limited to the pixel composed of three microdomes which are three types of microdome successively arranged in a row, as in the present embodiment.

In the present embodiment, the color display was performed using the dispersion media having colors of the three primary colors, Y, M, and C. However, the color display may be performed using the dispersion media having colors of other three primary colors, R, G and B. Although the white particles were used as the electrophoretic particles, black particles may be used.

A method for manufacturing the present embodiment will be described with reference to FIGS. 22A to 22C. The first electrode 4c for controlling each microdome is formed by patterning on the substrate 4a, and subsequently, the insulation layer 4m is formed (refer to FIG. 22A).

The substrate 4a is an arbitrary insulating member for supporting the electrophoretic display element, and glass, plastic and the like can be used therefor. The material for the first electrode 4c is not specifically limited, and Al, ITO and the like can be used. As the insulating layer 4m, acrylic resins, epoxy resins, fluororesins, silicone resins, polyimide resins, polystyrene resins, polyalkene resins and the like can be used.

Figure 22A:
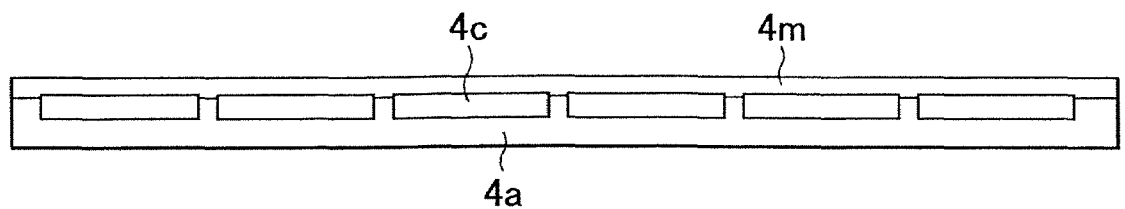
FIGS. 22A to 22C are step diagrams showing an example of a method for manufacturing another embodiment of an electrophoretic display element of the present invention.
Figure 22B:
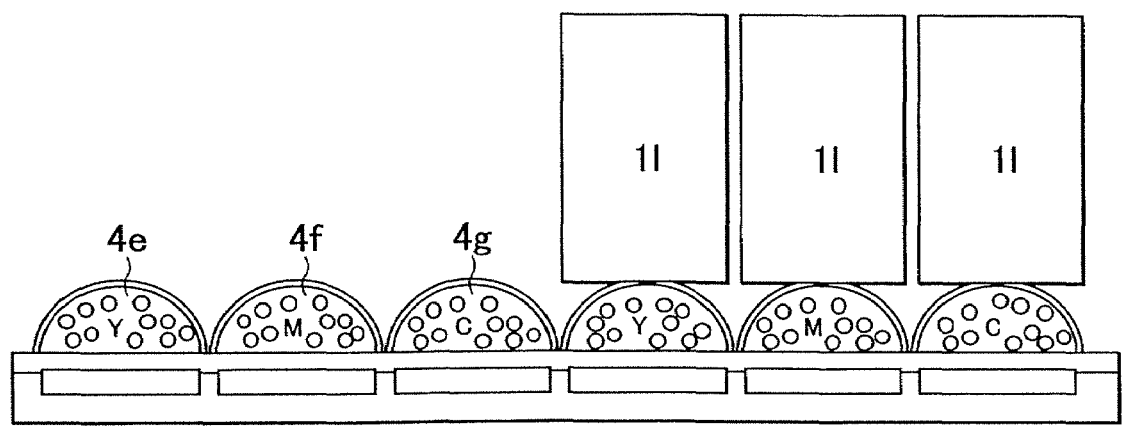

At least three types of multi-nozzle 1l are used, and three types of microdome 4e, 4f and 4g enclosing the dispersion media 4i, 4k and 4l colored Y, M and C, respectively, and the white electrophoretic particles 4j are formed in desired locations on the first electrode 4c (refer to FIG. 22B).

As described above, the concentric double-circle nozzle composed of the first nozzle 1m and the second nozzle 1n (FIGS. 6A and 6B) can be used for the multi-nozzle 1l of the present embodiment. The particle diameter of the microdome prepared in the present embodiment is 10 to 500 μm, and preferably, is 40 to 200 μm.

Figure 23A:
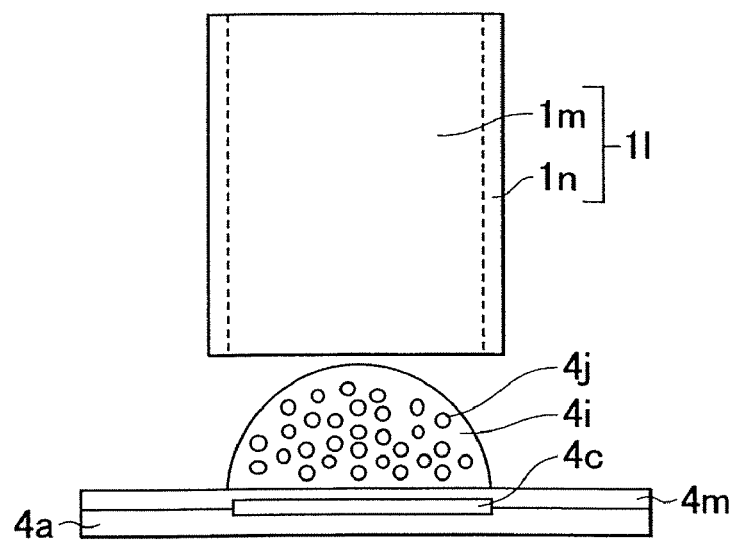
FIGS. 23A to 23C are schematic diagrams showing a forming process of a microdome by using a multi-nozzle.
Figure 23B:
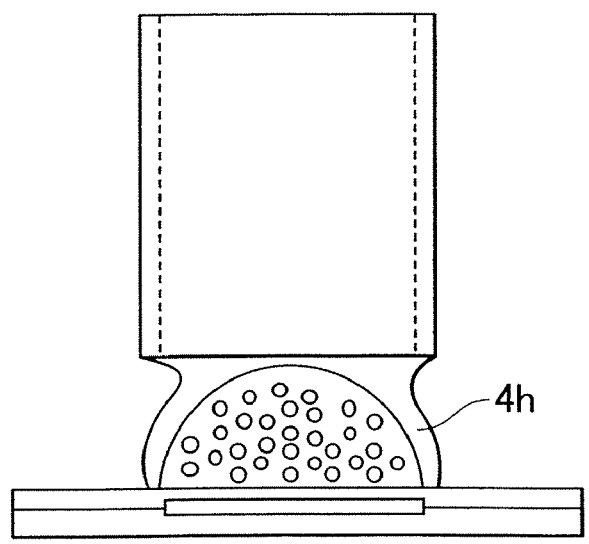
Figure 23C:
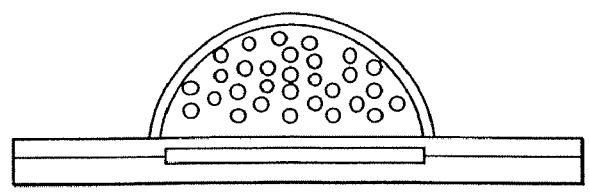

As is shown by schematic diagrams in FIGS. 23A to 23C, a suspension containing the electrophoretic particles and the dispersion medium is discharged from the first nozzle 1m, and subsequently, a coating material for covering the suspension is discharged from the second nozzle 1n, so that the microdomes 4e, 4f and 4g are formed.

When the microdomes 4e, 4f and 4g are formed, the multi-nozzle 1l may be vertically vibrated so as to control the discharge amounts of the suspension and the coating material. Furthermore, the discharge amounts of the suspension and the coating material can be controlled by each of the pumps (not shown in the drawing) provided for the tank 1p and the tank 1q and the discharge control device 1o provided for the multi-nozzle 1l, and therefore, microdomes having a uniform particle diameter can be formed.

When the microdomes 4e, 4f and 4g are formed and arranged in desired locations on the electrode substrate, the formation and arrangement of the microdomes may be performed while a voltage is applied to the first electrode 4c.

Figure 24A:
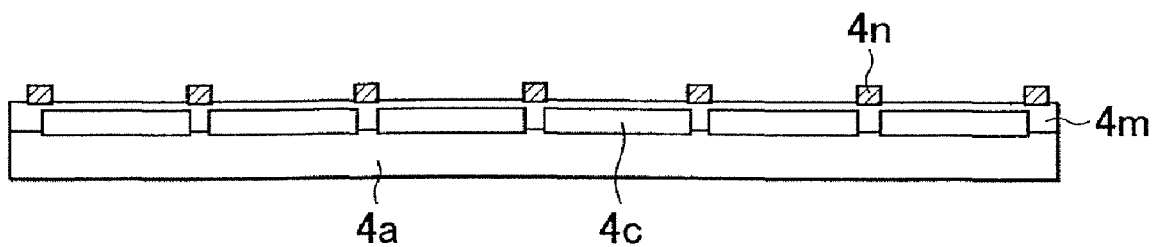
FIGS. 24A and 24B are diagrams showing an example of a pattern having variations in surface energy, formed on a substrate.
Figure 24B:
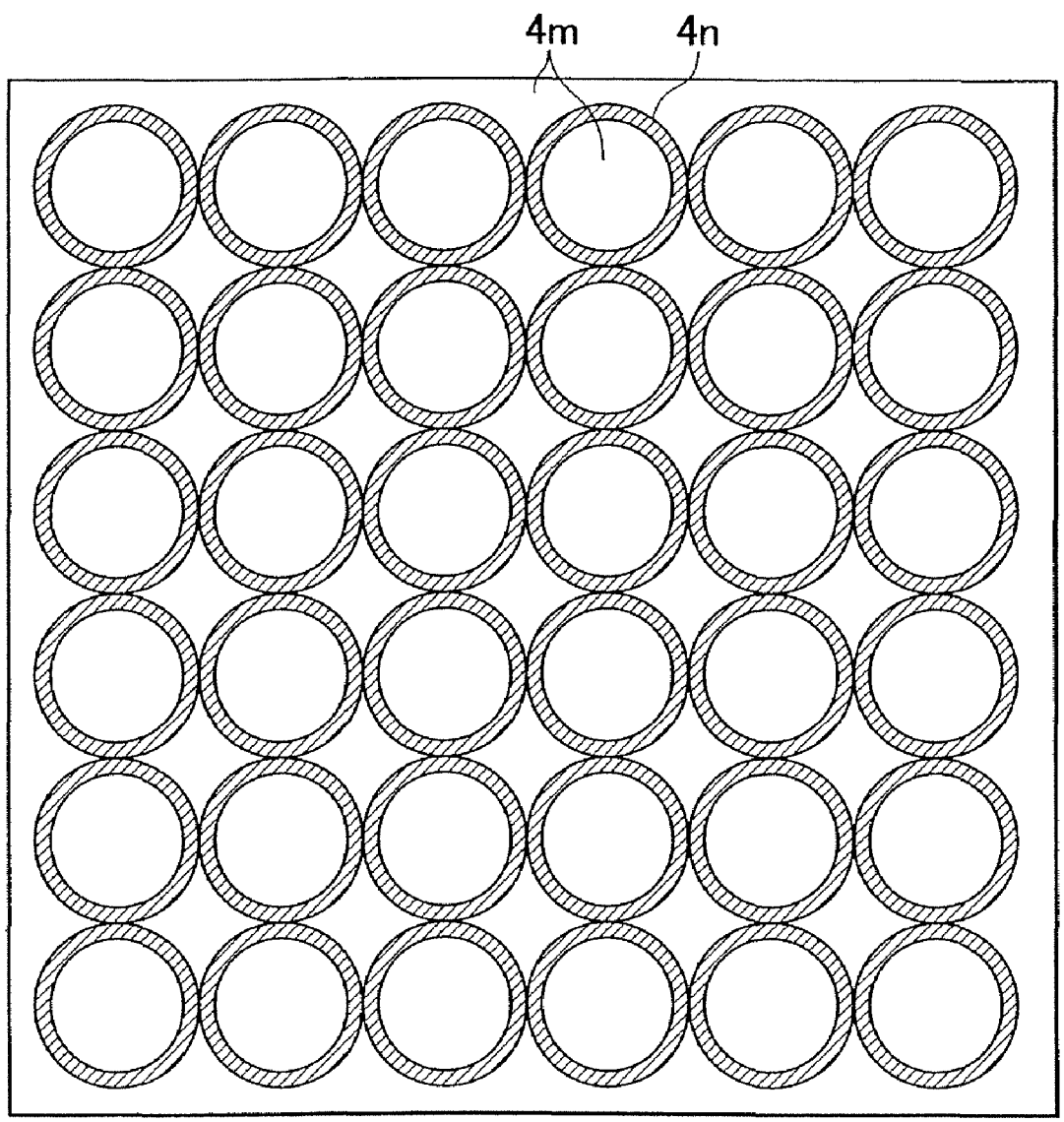

When the microdomes 4e, 4f and 4g are formed and arranged in desired locations on the electrode substrate, a pattern having variations in surface energy, as shown in FIGS. 24A and 24B, may be formed on the substrate in advance, and thereafter, the formation and arrangement of the microdomes may be performed. That is, regions having high affinity with the suspension (hydrophobic portions) and regions 4n having low affinity (hydrophilic portions) are formed by patterning on the insulating layer 4m on the substrate, droplets of the suspension are formed in the regions having high affinity, and subsequently, the coating material is discharged onto the regions having low affinity, so that microdomes are formed and arranged. The regions having high affinity with the suspension (hydrophobic portions) can be realized by a hydrophobic polymer, and the insulating layer 4m applies thereto. Examples of applicable polymers include, for example, acrylic resins, epoxy resins, fluororesins, silicone resins, polyimide resins, polystyrene resins and polyalkene resins, as described above. The regions 4n having low affinity with the suspension (hydrophilic portions) can be realized by a hydrophilic polymer, and be provided by patterning the hydrophilic polymer on the insulating layer 4m. As the hydrophilic polymer, poly(vinyl alcohol)s, polyacrylamides, polysaccharides, polyacrylic acids, mixture thereof or the like can be used.

When the microdomes 4e, 4f and 4g are formed and arranged in desired locations on the electrode substrate, the shape of projections and depressions, as shown in FIGS. 8A and 8B, may be formed by patterning on the substrate in advance, and microdomes may be formed and arranged therein.

In each of three types of tank 1p, the white electrophoretic particles 4j are in the condition of being dispersed in one of the dispersion media 4i, 4k and 4l colored Y, M and C, respectively.

As described above, a clear, colorless liquid having a highly insulating property can be used as the dispersion medium. The dispersion medium may contain a charge adjustor, a dispersing agent, a lubricant, a stabilizer and the like on an as needed basis.

In order to color the dispersion media Y, M, and C, the above-mentioned oil-soluble dyes for Y, M, and C can be used. In order to prepare the dispersion media having the other three primary colors, R, G, and B, the above-mentioned oil-soluble dyes for R, G, and B can be used.

As described above, titanium oxide, aluminum oxide, zinc oxide, lead oxide, tin oxide and the like can be used as white particles. Carbon black, diamond black, aniline black, manganese ferrite black and cobalt ferrite black can be used as black particles. Regarding the size of the electrophoretic particles, preferably, the particle diameters are 0.1 to 10 μm, and more preferably, are 0.2 to 6 μm. Preferably, the concentration of the electrophoretic particles is 3 to 30% by mass.

The coating material is stored in the tank 1q, and may contain a surfactant on an as needed basis. As described above, poly(styrene-maleic anhydride), poly(ethylene-maleic anhydride) and the like can be used as the surfactant. Preferably, the concentration of the surfactant is 1 to 10% by mass.

As described above, thermosetting polymers, UV-curing polymers and the like can be used as the coating material for constituting the microdome. Preferably, the concentration of the coating material is 70 to 90% by mass.

Regarding curing of the coating material of the microdome, all of the microdomes may be formed on the substrate, and thereafter, the coating materials thereof may be cured by one operation. The microdomes may successively be formed on the substrate while the coating materials thereof may successively be cured.

In the above-mentioned present embodiment, the multi-nozzle 1l was a concentric double-circle nozzle. However, a concentric multi-circle nozzle, e.g. a concentric triple-circle nozzle, as described above, or a multi-nozzle including a first nozzle and a second nozzle, which are arranged in parallel, or the like may be used. Furthermore, a linear nozzle provided with a plurality of the above-mentioned nozzles may be used.

In order to prevent deviation of the locations of the microdomes 4e, 4f and 4g arranged on the substrate, spaces between the microdomes 4e, 4f and 4g may be impregnated with a resin binder having a light-transmission property, and therefore, fixation onto the substrate may be performed. As described above, water-soluble polymers can be used as the resin binder having a light-transmission property.

Figure 22C:
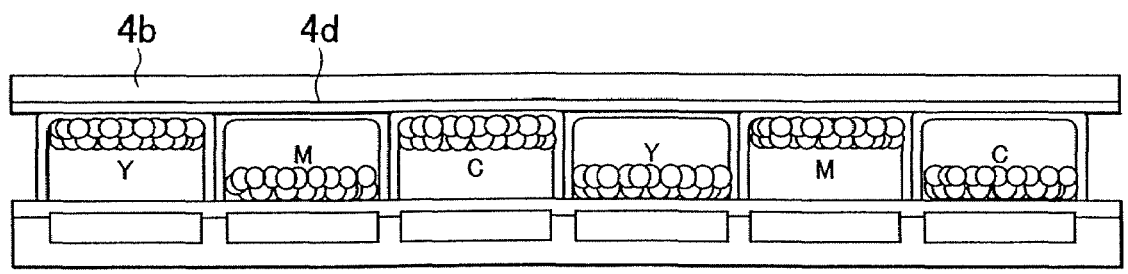

A layer of the microdomes arranged on the first electrode 4c is covered with the substrate 4b provided with the second electrode 4d, and the substrate 4a and the substrate 4b are sealed under a pressure in order that spaces between the microdomes 4e, 4f and 4g become at a minimum (refer to FIG. 22C).

The second electrode 4d is a transparent electrode formed in order to cover all the two-dimensionally arranged microdomes with the same potential, and ITO, an organic conductive film and the like can be used as the electrode material.

The substrate 4b is a display surface of the electrophoretic display element, and the material therefor is not specifically limited as long as it is an insulating transparent member. For example, glass having a light-transmission property, quartz or a plastic film, e.g. polyethylene terephthalate (PET) and poly (ethersulfone) (PES), can be used.

In the present embodiment, the color display was performed using the dispersion media colored Y, M and C and the white electrophoretic particles in the microdomes, although not limited to this. That is, as described with respect to FIGS. 9A and 9B, the color display may be performed using electrophoretic particles having the color of the three primary colors and another type of electrophoretic particles having a color and a polarity different therefrom in a clear, colorless dispersion medium.

Figure 25A:
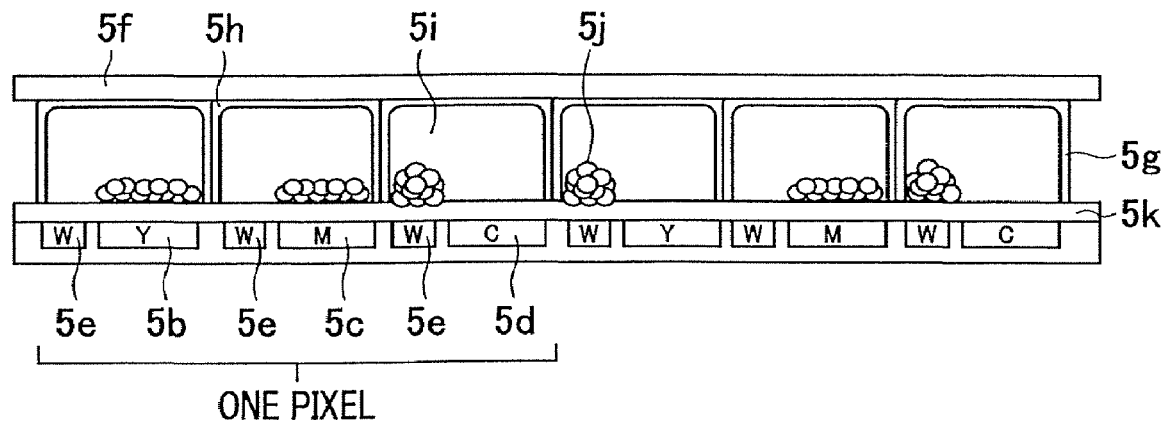
FIG. 25A is a sectional view showing another embodiment of an electrophoretic display element of the present invention.
Figure 25B:
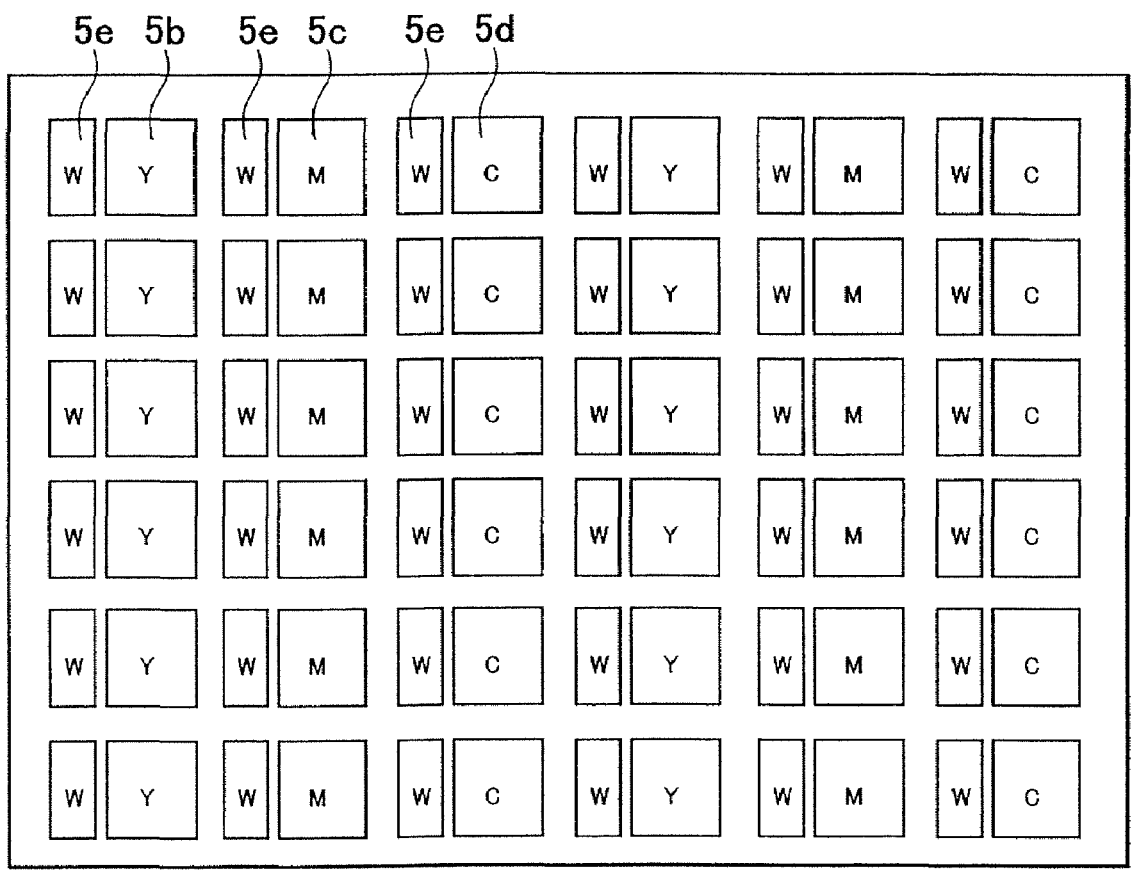
FIG. 25B is a top view.

Another embodiment of the display element of the present invention will be described below. FIGS. 25A and 25B are configuration diagrams showing another embodiment of the electrophoretic display element of the present invention, where a small partition is a microdome composed of a substrate and a coating material. FIG. 25A is a sectional view of an electrophoretic display element, and FIG. 25B is a diagram schematically showing an electrode substrate for controlling electrophoretic particles in microdomes. As shown in FIG. 25A, in the electrophoretic display element of the present invention, first electrodes 5b, 5c and 5d and a second electrode 5e are provided on a substrate 5a, and furthermore, an insulating layer 5k is provided on the electrodes. The first electrode 5b is colored Y, the first electrode 5c is colored M, the first electrode 5d is colored C, and the second electrode 5e is colored white. A microdome 5g is arranged on the first electrode and the second electrode with the insulating layer 5k therebetween, and is covered with a protective layer 5f. The microdomes 5g are deformed by the protective layer 5f, and thereby, spaces between the microdomes are reduced, regarding the structure. The microdome 5g encloses a clear, colorless dispersion medium 5i and electrophoretic particles 5j, and the microdomes 5g are arranged on the first electrodes 5b, 5c and 5d and the second electrode 5e. In this electrophoretic display element, the side provided with the protective layer 5f is a display surface. As shown in FIG. 25B, each of the first electrodes 5b, 5c and 5d is paired up with the second electrode 5e, and pairs are provided in a two-dimensional arrangement in the row direction and the column direction, as well as in a stripe arrangement in which the electrodes having the same color are aligned in the column direction.

In order to prevent deviation of the locations of the microdomes 5g arranged on the substrate, spaces between the microdomes 5g may be impregnated with a resin binder having a light-transmission property, and therefore, fixation onto the substrate may be performed.

The first electrodes 5b, 5c and 5d and the second electrode 5e are pixel electrodes capable of independently applying a desired electric field to each microdome 5g arranged as shown in FIG. 25A. These pixel electrodes are provided with switching elements, a selection signal is applied from a matrix driving circuit, not shown in the drawing, on a row basis, a control signal and an output from a driving transistor are applied to each column, and therefore, a desired electric field can be applied to each of the microdomes 5g.

Figure 26A:
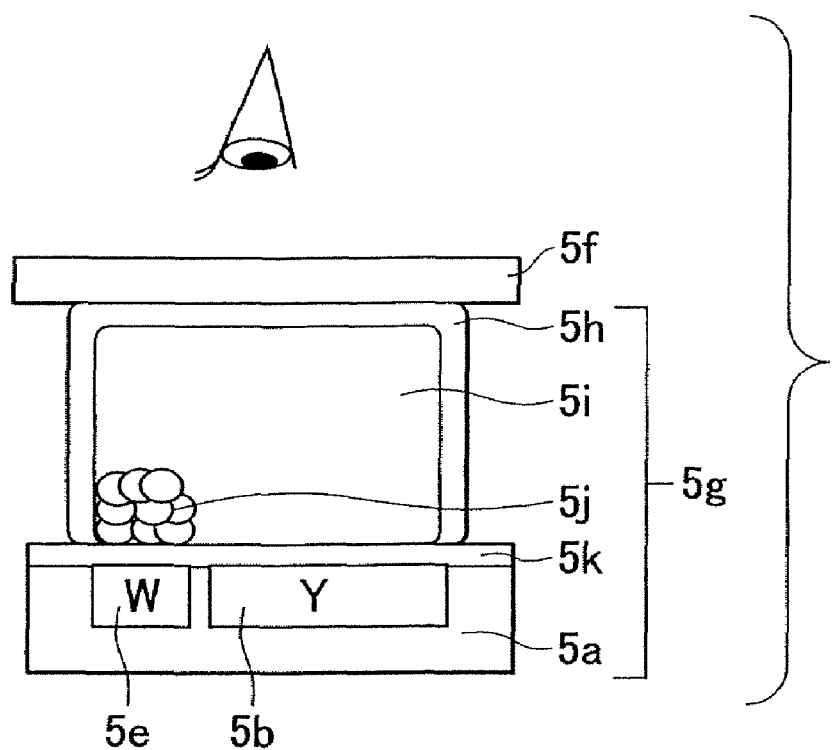
FIGS. 26A and 26B are schematic diagrams showing a displaying method of a microdome in an electrophoretic display element of the present invention.
Figure 26B:
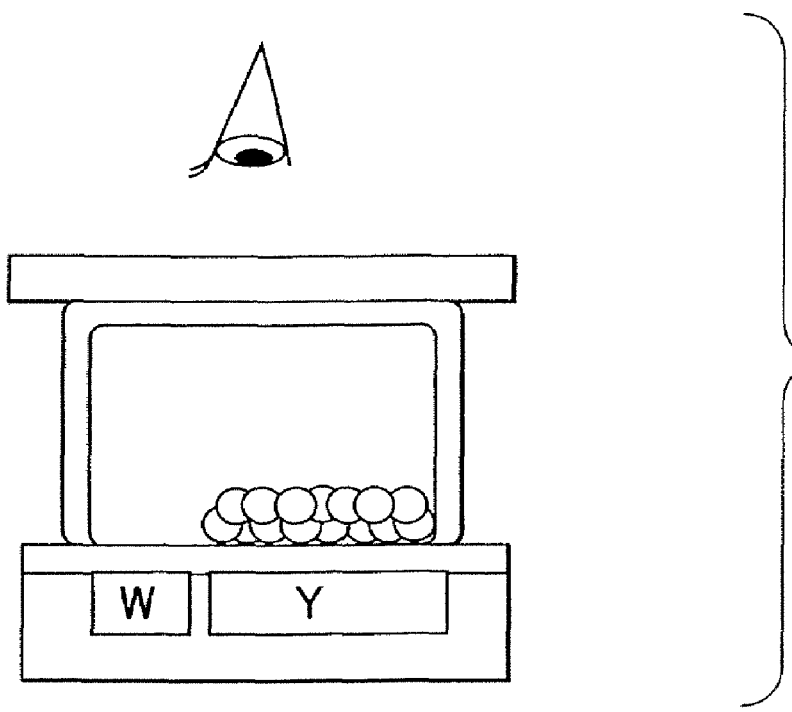

The display of each microdome 5g will be described with reference to FIGS. 26A and 26B. The microdome 5g encloses the negatively charged white electrophoretic particles 5j in the clear, colorless dispersion medium 5i. Regarding the microdome 5g, when the first electrode 5b is negatively charged, and the second electrode 5e is positively charged, the negatively charged white electrophoretic particles 5j move above the second electrode 5e. Consequently, when the microdome 5g is observed from above, the microdome appears to be Y. On the other hand, when the first electrode 5b is positively charged, and the second electrode 5e is negatively charged, the white particles 5j move above the first electrode 5b. Consequently, when the microdome 5g is observed from above, the microdome appears to be white. Although explanation was made using the white electrophoretic particles here, black electrophoretic particles may be used. However, in this case, preferably, the second electrode 5e is black.

In FIGS. 25A and 25B, the microdomes 5g are controlled by electric fields applied by the first electrodes 5b, 5c and 5d and the second electrode 5e, and each microdome 5g controls each color of the first electrodes 5b, 5c and 5d and the second electrode 5e by movement of the electrophoretic particles enclosed. The first electrodes 5b, 5c and 5d are arranged in a repeated order as YMCYMC in the row direction, as shown in FIG. 25B. The control is performed on the assumption that the display portion of one pixel is composed of successive pairs of the first electrodes 5b, 5c and 5d and the second electrode 5e described above. High-definition color display can be performed by controlling each pixel.

The configuration of the first electrode and the second electrode is not limited to the present embodiment, and may be the dot electrodes shown in FIG. 16. The two-dimensional arrangement thereof is not limited to the arrangement shown in FIGS. 25A, 25B and 16, and may be, for example, the mosaic arrangement shown in FIG. 4A and the triangular arrangement shown in FIG. 4B.

Since display contrast significantly depends on the area ratio of the first electrode to the second electrode, the area of the second electrode must be reduced relative to that of the first electrode in order to increase the contrast. Preferably, the area ratio of the first electrode to the second electrode is in the order of 2:1 to 4:1.

Likewise, the configuration of the pixel is not limited to the pixel composed of three microdomes provided on the electrodes of Y, M and C, successively arranged in a row, as in the present embodiment.

The color display was performed using the electrodes colored Y, M and C as the three primary colors in the present embodiment. However, the color display may be performed using the electrodes colored R, G and B as other three primary colors. Although the electrode colored white was used as the second electrode 5e, the color may be black. In that case, black electrophoretic particles are preferable.

A method for manufacturing the present embodiment will be described with reference to FIGS. 27A to 27C. The first electrodes 5b, 5c and 5d and the second electrode 5e, for controlling each microdome, are formed by patterning on the substrate 5a, and thereafter, color filters for Y, M and C are provided on the first electrodes 5b, 5c and 5d, and the second electrode 5e is provided with a white color filter. Subsequently, the insulating layer 5k is formed (refer to FIG. 27A).

The substrate 5a is an arbitrary insulating member for supporting the electrophoretic display element, and glass, plastic and the like can be used therefor. The material for the first electrodes 5b, 5c and 5d and the second electrode 5e is not specifically limited, and ITO, Al and the like can be used.

Color resists of Y, M and C can be used as the color filters for Y, M and C, and an acrylic resin containing alumina fine particles or titania fine particles can be used for a white filter. When color display is performed using other three primary colors, R, G and B, the first electrodes 5b, 5c and 5d may be constructed by providing color filters for R, G and B on an ITO electrode formed by patterning.

As the insulating layer 5k, acrylic resins, epoxy resins, fluororesins, silicone resins, polyimide resins, polystyrene resins, polyalkene resins and the like can be used.

Figure 27A:
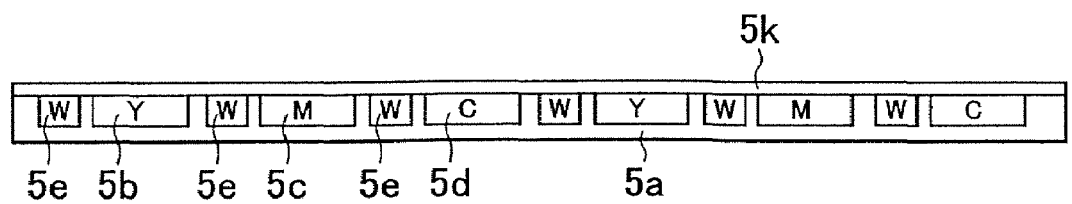
FIGS. 27A to 27C are step diagrams showing an example of a method for manufacturing another embodiment of an electrophoretic display element of the present invention.
Figure 27B:
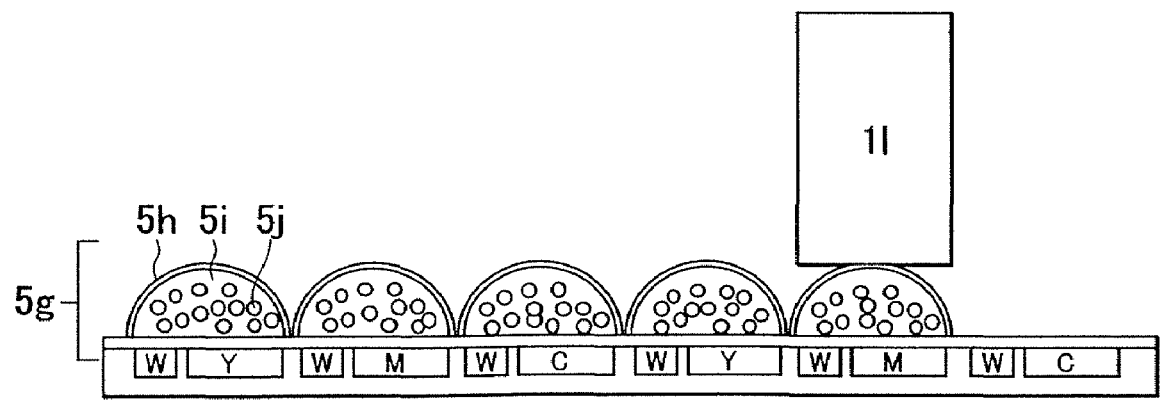

A multi-nozzle 1l is used, and microdomes 5g enclosing the clear, colorless dispersion medium 5i and the electrophoretic particles 5j are formed in desired locations on the first electrodes 5b, 5c and 5d and the second electrode 5e (refer to FIG. 27B).

As described above, the concentric double-circle nozzle composed of the first nozzle 1m and the second nozzle in (FIGS. 6A and 6B) can be used for the multi-nozzle 1l of the present embodiment. The particle diameter of the microdome prepared in the present embodiment is 10 to 500 μm, and preferably, is 40 to 200 μm.

As is shown by schematic diagrams in FIGS. 23A to 23C, a suspension containing the electrophoretic particles and the dispersion medium is discharged from the first nozzle 1m at a desired location on the electrode substrate, and subsequently, a coating material for covering the suspension is discharged from the second nozzle 1n, so that the microdome 5g is formed.

As described above, when the microdome 5g is formed, the multi-nozzle 1l may be vertically vibrated so as to control the discharge amounts of the suspension and the coating material. Furthermore, the discharge amounts of the suspension and the coating material can be controlled by each of the pumps (not shown in the drawing) provided for the tank 1p and the tank 1q and the discharge control device 1o provided for the multi-nozzle 1l, and therefore, microdomes having a uniform shape can be formed.

When the microdomes 5g are formed and arranged in desired locations on the electrode substrate, in a manner similar to that described above, the formation and arrangement of the microdomes may be performed while a voltage is applied to the first electrodes and the second electrode.

As described above, when the microdomes 5g are formed and arranged in desired locations on the electrode substrate, a pattern having variations in surface energy, as shown in FIGS. 24A and 24B, may be formed on the substrate in advance, and thereafter, the formation and arrangement of the microdomes may be performed.

When the microdomes 5g are formed and arranged in desired locations on the electrode substrate, in a manner similar to that described above, the shape of projections and depressions, as shown in FIGS. 8A and 8B, may be formed by patterning on the substrate in advance, and microdomes may be formed and arranged therein.

In the tank 1p, the white electrophoretic particles 5j are in the condition of being dispersed in the clear, colorless dispersion medium 5i. As described above, a clear, colorless liquid having a highly insulating property can be used as the dispersion medium 5i. The dispersion medium may contain a charge adjustor, a dispersing agent, a lubricant, a stabilizer and the like on an as needed basis.

As described above, titanium oxide, aluminum oxide, zinc oxide, lead oxide, tin oxide and the like can be used as white particles. Carbon black, diamond black, aniline black, manganese ferrite black, cobalt ferrite black and the like can be used as black particles. Regarding the size of the electrophoretic particles, preferably, the particle diameters are 0.1 to 10 μm, and more preferably, are 0.2 to 6 μm. Preferably, the concentration of the electrophoretic particles is 1 to 10% by mass.

The coating material is stored in the tank 1q, and may contain a surfactant on an as needed basis. In a manner similar to that described above, poly(styrene-maleic anhydride), poly(ethylene-maleic anhydride) and the like can be used as the surfactant. Preferably, the concentration of the surfactant is 1 to 10% by mass.

As described above, thermosetting polymers, UV-curing polymers and the like can be used as the coating material for constituting the microdome. Preferably, the concentration of the coating material is 70 to 90% by mass.

Regarding curing of the coating material of the microdome, all of the microdomes may be formed on the substrate, and thereafter, the coating materials thereof may be cured by one operation. The microdomes may successively be formed on the substrate while the coating materials thereof may successively be cured.

In the present embodiment, the concentric double-circle nozzle were described. However, as described above, a concentric multi-circle nozzle, e.g. a concentric triple-circle nozzle, a multi-nozzle including a first nozzle and a second nozzle, which are arranged in parallel, or the like may be used. Furthermore, a linear nozzle provided with a plurality of the above-mentioned nozzles may be used.

In order to prevent deviation of the locations of the microdomes 5g arranged on the substrate, spaces between the microdomes 5g may be impregnated with a resin binder having a light-transmission property, and therefore, fixation onto the substrate may be performed. As described above, water-soluble polymers can be used as the resin binder having a light-transmission property.

Figure 27C:
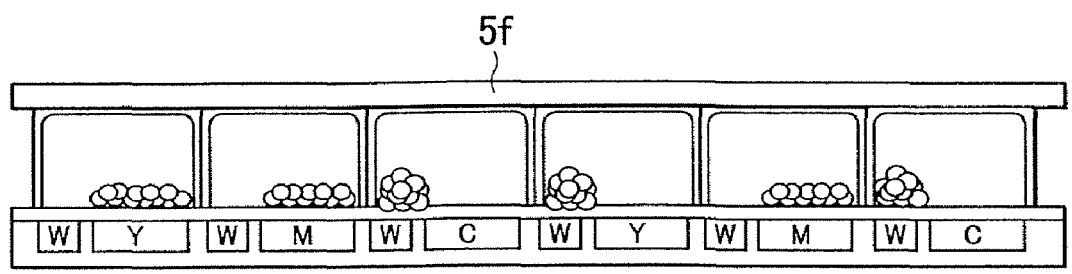

A layer of the microdomes 5g arranged on the first electrodes 5b, 5c and 5d and the second electrode 5e is covered with the protective layer 5f, and the substrate 5a and the protective layer 5f are sealed under a pressure in order that spaces between the microdomes become at a minimum (refer to FIG. 27C).

The protective layer 5f is a display surface of the electrophoretic display element. The material therefor is not specifically limited as long as it is an insulating transparent member, and glass, plastic and the like can be used.

As described above, in the present invention, small partitions enclosing the suspension composed of the electrophoretic particles and the dispersion medium are formed in desired locations on the electrode substrate by using the multi-nozzle. Consequently, the electrophoretic display element capable of performing high-contrast, high-definition color display can be provided.

The examples of the present invention will be described below.

EXAMPLE 1

The electrophoretic display element shown in FIGS. 1A and 1B was prepared in accordance with the manufacturing process shown in FIGS. 5A to 5C.

As a first electrode 1c, Al of about 0.2 μm thickness was formed by patterning on a substrate 1a made of a PET film of 200 μm thickness.

Three types of multi-nozzle 1l were used, and microcapsules 1e, 1f and 1g were formed on the first electrode 1c provided on the substrate 1a. The concentric double-circle nozzle shown in FIGS. 6A and 6B was used as the multi-nozzle 1l. The sizes of a first nozzle 1m and the second nozzle in were 50 μm and 1 μm, respectively.

In each of three types of tank 1p, white electrophoretic particles 1i were in the condition of being dispersed in one of the dispersion media 1h, 1j and 1k colored Y, M and C, respectively. Titanium oxide (Du Pont R-104) (particle diameter 0.22 μm, 15% by mass) was used as the white electrophoretic particles 1i, and OLOA 1200 (Chevron) (0.5% by mass) was used as a charging agent and a dispersing agent for the electrophoretic particles 1i. Isoper H (Exxon Chemical) (83.5% by mass) was used as the dispersion medium, Oil Yellow 129 (Orient Chemical Industries) (1% by mass) was used as a dye for Y, Oil Pink 312 (Orient Chemical Industries) (1% by mass) was used as a dye for M, and Oil Blue BOS (Orient Chemical Industries) (1% by mass) was used as a dye for C.

Each of three types of tank 1q was filled in with an aqueous thermosetting prepolymer (75% by mass) of urea-formaldehyde-based methylol containing a surfactant (styrene-maleic anhydride alternating copolymer, 5% by mass), as a coating material.

The tank 1p and the tank 1q were coupled to the first nozzle 1m and the second nozzle 1n, respectively. The suspension containing the electrophoretic particles and the dispersion medium was discharged from the first nozzle 1m, and the coating material for covering the suspension was discharged from the second nozzle 1n. Consequently, microcapsules 1e, 1f and 1g were formed in desired locations on the first electrode 1c. The discharge amounts of the suspension and the coating material were controlled by each of the pumps provided for the tank 1p and the tank 1q and the discharge control device 1o provided for the multi-nozzle 1l, and therefore, microcapsules 1e, 1f and 1g having a uniform particle diameter of 50 μm were formed. In the present Example, a piezoelectric-crystal element was used as the discharge control device 1o. All of the microcapsules 1e, 1f and 1g were formed on the electrode, and thereafter, the coating materials thereof were cured by one operation through infrared-ray irradiation so as to change into an infusible, insoluble urea resin.

In order to prevent deviation of the locations of the microcapsules 1e, 1f, and 1g formed and arranged on the substrate, spaces between the microcapsules 1e, 1f, and 1g were impregnated with a resin binder having a light-transmission property, and therefore, fixation onto the substrate was performed. Poly(vinyl alcohol) was used as the resin binder having a light-transmission property.

The substrate 1a provided with the microcapsules 1e, 1f, and 1g and the substrate 1b made of the PET film (thickness 200 μm) provided with a film of ITO of about 0.1 μm thickness as a second electrode were adhered, followed by sealing. A voltage application device was provided so as to prepare a display device, and display was performed. The electrophoretic particles in the microcapsules 1e, 1f, and 1g constituting each pixel were driven between the upper and lower electrode. As a result, desired color display was able to be performed, and in addition to this, high-contrast, high-definition color display was able to be achieved.

EXAMPLE 2

The electrophoretic display element shown in FIGS. 9A and 9B was prepared in accordance with the manufacturing process shown in FIGS. 13A to 13C.

In a manner similar to that in Example 1, Al of about 0.2 μm thickness, as the first electrode 2c, was formed by patterning on a substrate 2a made of a PET film of 200 μm thickness.

Three types of multi-nozzle 1l were used, and microcapsules 2e, 2f and 2g were formed on the first electrode 2c of the substrate 2a. The concentric double-circle nozzle shown in FIGS. 6A and 6B was used as the multi-nozzle 1l. The sizes of a first nozzle 1m and the second nozzle in were 50 μm and 1 μm, respectively.

In each of three types of tank 1p, a pair of the white electrophoretic particles 2j and one of the electrophoretic particles 2i, 2k and 2l having the color of R, G and B, respectively, were in the condition of being dispersed in the clear, colorless dispersion medium 2h. Titanium oxide (Du Pont R-104) (particle diameter 0.2 μm, 15% by mass) was used as the white electrophoretic particles 2j, quinacridone red (particle diameter 0.3 μm, 15% by mass) was used as the electrophoretic particles 2i for R, phthalocyanine green (particle diameter 0.2 μm, 15% by mass) was used as the electrophoretic particles 2k for G, and cobalt blue (particle diameter 0.3 μm, 15% by mass) was used as the electrophoretic particles 2l for B.

OLOA 1200 (Chevron) (1% by mass) was used as a charging agent and a dispersing agent for the electrophoretic particles. Isoper H (Exxon Chemical) (69% by mass) was used as a dispersion medium 2h.

Each of three types of tank 1q was filled in with an aqueous thermosetting prepolymer (85% by mass) of melamine-formaldehyde-based methylol containing a surfactant (ethylene-maleic anhydride alternating copolymer, 3% by mass), as a coating material.

The tank 1p and the tank 1q were coupled to the first nozzle 1m and the second nozzle 1n, respectively. The suspension containing the electrophoretic particles and the dispersion medium was discharged from the first nozzle 1m, and the coating material for covering the suspension was discharged from the second nozzle 1n. Consequently, microcapsules 2e, 2f and 2g were formed in desired locations on the first electrode 2c. The discharge amounts of the suspension and the coating material were controlled by each of the pumps provided for the tank 1p and the tank 1q and the discharge control device 1o provided for the multi-nozzle 1l, and therefore, microcapsules 2e, 2f and 2g having a uniform particle diameter of 50 μm were formed. In the present Example, a piezoelectric-crystal element was used as the discharge control device 1o. The microcapsules 2e, 2f and 2g were successively formed on the electrode, while the coating materials thereof were successively cured by infrared-ray irradiation so as to change into an infusible, insoluble melamine resin.

In order to prevent deviation of the locations of the microcapsules 2e, 2f, and 2g formed and arranged on the substrate, spaces between the microcapsules 2e, 2f, and 2g were impregnated with a resin binder having a light-transmission property, and therefore, fixation onto the substrate was performed. Polyurethane was used as the resin binder having a light-transmission property.

The substrate 2a provided with the microcapsules 2e, 2f, and 2g and the substrate 2b made of the PET film (thickness 200 μm) provided with a film of ITO of about 0.1 μm thickness as a second electrode were adhered, followed by sealing. A voltage application device was provided so as to prepare a display device, and display was performed. The electrophoretic particles in the microcapsules 2e, 2f, and 2g constituting each pixel were driven between the upper and lower electrode. As a result, desired color display was able to be performed, and in addition to this, high-contrast, high-definition color display was able to be achieved.

EXAMPLE 3

The electrophoretic display element shown in FIGS. 14A and 14B was prepared in accordance with the manufacturing process shown in FIGS. 17A to 17C.

ITO electrodes of about 0.15 μm thickness were formed by patterning on a substrate 3a made of a PET film of 200 μm thickness. A color filter layer of about 1.5 μm thickness was provided on each ITO electrode by using a color resist of Y, M or C, and thereby, the first electrodes 3b, 3c and 3d were manufactured. On the other hand, a white filter layer of about 1.5 μm thickness was provided using an acrylic resin containing titania fine particles on the ITO electrode similarly formed by patterning, and thereby, the second electrodes 3e were manufactured. At this time, the area ratio of the first electrode to the second electrode was 4:1.

A multi-nozzle 1l was used, and microcapsules 3g were formed in desired locations on the first electrode and the second electrode of the substrate 3a. The concentric double-circle nozzle shown in FIGS. 6A and 6B was used as the multi-nozzle 1l. The sizes of a first nozzle 1m and the second nozzle in were 65 μm and 1.3 μm, respectively.

In a tank 1p, white electrophoretic particles 3i were in the condition of being dispersed in a clear, colorless dispersion medium 3h. Titanium oxide (particle diameter 0.2 μm, Du Pont R-104) (4% by mass) was used as the white electrophoretic particles 3i, and OLOA 1200 (Chevron) (0.1% by mass) was used as a charging agent and a dispersing agent for the electrophoretic particles 3i. Isoper H (Exxon Chemical) (95.9% by mass) was used as the dispersion medium 3h.

The tank 1q was filled in with an aqueous UV-curing prepolymer (80% by mass) of urethane acrylate containing a surfactant (ethylene-maleic anhydride alternating copolymer, 5% by mass), as a coating material.

The tank 1p and the tank 1q were coupled to the first nozzle 1m and the second nozzle 1n, respectively. The suspension containing the electrophoretic particles and the dispersion medium was discharged from the first nozzle 1m, and the coating material for covering the suspension was discharged from the second nozzle in. Consequently, microcapsules 3g were formed in desired locations on the substrate 3a. The discharge amounts of the suspension and the coating material were controlled by each of the pumps provided for the tank 1p and the tank 1q and the discharge control device 1o provided for the multi-nozzle 1l, and therefore, microcapsules 3g having a uniform particle diameter of 65 μm were formed. In the present Example, a heat-foaming element was used as the discharge control device 1o. All of the microcapsules 3g were formed on the electrode, and thereafter, the coating materials thereof were cured by one operation through UV irradiation so as to change into polyurethane.

In order to prevent deviation of the locations of the microcapsules 3g formed and arranged on the substrate, spaces between the microcapsules 3g were impregnated with a resin binder having a light-transmission property, and therefore, fixation onto the substrate was performed. Polyurethane was used as the resin binder having a light-transmission property.

A layer of the microcapsules 3g arranged on the substrate 3a was covered with a protective layer 3f made of a PET film of 200 μm thickness, and the substrate 3a and the protective layer 3f were sealed under a pressure in order that, regarding the shape of the microcapsule 3g, the length in the horizontal direction became longer than the length in the direction perpendicular to the substrate 3a. Furthermore, a voltage application device was provided so as to prepare a display device, and display was performed. The electrophoretic particles in the microcapsules 3g constituting each pixel were horizontally driven between the electrodes. As a result, desired color display was able to be performed, and in addition to this, high-contrast, high-definition color display was able to be achieved.

EXAMPLE 4

The electrophoretic display element shown in FIGS. 19A and 19B was prepared in accordance with the manufacturing process shown in FIGS. 22A to 22C.

As a first electrode 1c, Al of about 0.2 μm thickness was formed by patterning on a substrate 4a made of a PET film of 200 μm thickness. Furthermore, an insulating layer 4m of about 1 μm thickness was formed thereon by using an acrylic resin.

Three types of multi-nozzle 1l were used, and microdomes (small partitions) 4e, 4f and 4g were formed on the first electrode 4c of the substrate 4a. The concentric double-circle nozzle shown in FIGS. 6A and 6B was used as the multi-nozzle 1l. The sizes of a first nozzle 1m and the second nozzle in were 50 μm and 1 μm, respectively.

In each of three types of tank 1p, white electrophoretic particles 4j were in the condition of being dispersed in one of the dispersion media 4i, 4k and 4l colored Y, M and C, respectively. Titanium oxide (Du Pont R-104) (particle diameter 0.22 μm, 15% by mass) was used as the white electrophoretic particles 4j, and OLOA 1200 (Chevron) (0.5% by mass) was used as a charging agent and a dispersing agent for the electrophoretic particles 4j. Isoper H (Exxon Chemical) (83.5% by mass) was used as the dispersion medium, Oil Yellow 129 (Orient Chemical Industries) (1% by mass) was used as a dye for Y, Oil Pink 312 (Orient Chemical Industries) (1% by mass) was used as a dye for M, and Oil Blue BOS (Orient Chemical Industries) (1% by mass) was used as a dye for C.

Each of three types of tank 1q was filled in with an aqueous UV-curing prepolymer (80% by mass) of urethane acrylate containing a surfactant (styrene-maleic anhydride alternating copolymer, 5% by mass), as a coating material.

The tank 1p and the tank 1q were coupled to the first nozzle 1m and the second nozzle 1n, respectively. The suspension containing the electrophoretic particles and the dispersion medium was discharged from the first nozzle 1m, and subsequently, the coating material for covering the suspension was discharged from the second nozzle 1n. Consequently, microdomes 4e, 4f and 4g were formed in desired locations on the first electrode 4c. The discharge amounts of the suspension and the coating material were controlled by each of the pumps provided for the tank 1p and the tank 1q and the discharge control device 1o provided for the multi-nozzle 1l, and therefore, microdomes 4e, 4f and 4g having a uniform particle diameter of 50 μm were formed. In the present Example, a heat-foaming element was used as the discharge control device 1o. All of the microdomes 4e, 4f and 4g were formed on the electrode, and thereafter, the coating materials thereof were cured by one operation through UV irradiation so as to change into polyurethane.

In order to prevent deviation of the locations of the microdomes 4e, 4f and 4g formed and arranged on the substrate, spaces between the microdomes 4e, 4f and 4g were impregnated with a resin binder having a light-transmission property, and therefore, fixation onto the substrate was performed. Polyurethane was used as the resin binder having a light-transmission property.

The substrate 4a provided with the microdomes 4e, 4f and 4g was covered with the substrate 4b made of the PET film (thickness 200 μm) provided with a film of ITO of about 0.1 μm thickness as a second electrode. The substrate 4a and the substrate 4b were sealed under a pressure in order that spaces between the microdomes become at a minimum. Furthermore, a voltage application device was provided so as to prepare a display device, and display was performed. The electrophoretic particles in the microdomes 4e, 4f and 4g constituting each pixel were driven between the upper and lower electrodes. As a result, desired color display was able to be performed, and in addition to this, high-contrast, high-definition color display was able to be achieved.

EXAMPLE 5

The electrophoretic display element shown in FIGS. 25A and 25B was prepared in accordance with the manufacturing process shown in FIGS. 27A to 27C.

ITO electrodes of about 0.15 μm thickness were formed by patterning on a substrate 5a made of a PET film of 200 μm thickness. A color filter layer of about 1.5 μm thickness was provided on each ITO electrode by using a color resist of Y, M or C, and thereby, the first electrodes 5b, 5c and 5d were manufactured. On the other hand, a white filter layer of about 1.5 μm thickness was provided using an acrylic resin containing titania fine particles on the ITO electrode similarly formed by patterning, and thereby, the second electrodes 5e were manufactured. At this time, the area ratio of the first electrode to the second electrode was 4:1. Furthermore, an insulating layer 5k of about 1 μm thickness was formed on the electrode by using an acrylic resin.

A multi-nozzle 1l was used, and microdomes 5g were formed in desired locations on the first electrodes and the second electrode of the substrate 5a. The concentric double-circle nozzle shown in FIGS. 6A and 6B was used as the multi-nozzle 1l. The sizes of a first nozzle 1m and the second nozzle in were 65 μm and 1.3 μm, respectively.

In a tank 1p, white electrophoretic particles 5j were in the condition of being dispersed in a clear, colorless dispersion medium 5i. Titanium oxide (particle diameter 0.2 μm, Du Pont R-104) (4% by mass) was used as the white electrophoretic particles 5j, and OLOA 1200 (Chevron) (0.1% by mass) was used as a charging agent and a dispersing agent for the electrophoretic particles 5j. Isoper H (Exxon Chemical) (95.9% by mass) was used as the dispersion medium 5i.

The tank 1q was filled in with an aqueous UV-curing prepolymer (83% by mass) of melamine acrylate containing a surfactant (ethylene-maleic anhydride alternating copolymer, 4% by mass), as a coating material.

The tank 1p and the tank 1q were coupled to the first nozzle 1m and the second nozzle 1n, respectively. The suspension containing the electrophoretic particles and the dispersion medium was discharged from the first nozzle 1m, and subsequently, the coating material for covering the suspension was discharged from the second nozzle 1n. Consequently, microdomes 5g were formed in desired locations on the first electrodes 5b, 5c and 5d and the second electrode 5e. The discharge amounts of the suspension and the coating material were controlled by each of the pumps provided for the tank 1p and the tank 1q and the discharge control device 1o provided for the multi-nozzle 1l, and therefore, microdomes 5g having a uniform particle diameter of 65 μm were formed. In the present Example, a heat-foaming element was used as the discharge control device 1o. After the microdomes 5g were formed on the electrode, the coating materials thereof were cured by one operation through UV irradiation so as to change into a melamine resin.

In order to prevent deviation of the locations of the microdomes 5g formed and arranged on the substrate, spaces between the microdomes 5g were impregnated with a resin binder having a light-transmission property, and therefore, fixation onto the substrate was performed. Poly(vinyl alcohol) was used as the resin binder having a light-transmission property.

A layer of the microdomes 5g arranged on the first electrodes 5b, 5c and 5d and the second electrode 5e of the substrate 5a was covered with a protective layer 5f made of a PET film (thickness 200 μm), and the substrate 5a and the protective layer 5f were sealed under a pressure in order that spaces between the microdomes become at a minimum. Furthermore, a voltage application device was provided so as to prepare a display device, and display was performed. The electrophoretic particles in the microdomes 5g constituting each pixel were horizontally driven between the electrodes. As a result, desired color display was able to be performed, and in addition to this, high-contrast, high-definition color display was able to be achieved.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for manufacturing an electrophoretic display element including microcapsules, each of the microcapsules comprising a suspension comprising electrophoretic particles and a dispersion medium and a film formed of a coating material covering the suspension, the method comprising the steps of:

providing a substrate having an electrode pattern;

providing at least two concentrically arranged nozzles at a predetermined distance from the substrate;

discharging the suspension from one of the concentrically arranged nozzles and discharging the coating material from another one of the concentrically arranged nozzles at a desired location of the electrode pattern on the substrate; and repeating the discharging step while the substrate is translated, thereby arranging the microcapsules on the substrate, wherein the discharging step comprises a step of adhering the coating material to the suspension arranged on the substrate so as to form a partition enclosing the suspension with the substrate and the coating material.

2. The method for manufacturing an electrophoretic display element according to claim 1, further comprising the step of curing the coating material so as to form a dome-shaped microcapsule.

3. The method for manufacturing an electrophoretic display element according to claim 1, wherein the step of repeating the discharging step while the substrate is translated results in the partitions comprising the suspension and the coating material being successively arranged.

4. The method for manufacturing an electrophoretic display element according to claim 3, further comprising the step of curing the coating material by one operation after the discharging step is repeated.

5. The method for manufacturing an electrophoretic display element according to claim 1, wherein the electrode pattern is in a two-dimensional arrangement in (1) a grid or stripe arrangement in which microcapsules having the same color are aligned in a column direction or (2) a triangular or mosaic arrangement in which microcapsules having the same color are not aligned in the column direction.

6. The method for manufacturing an electrophoretic display element according to claim 1, wherein the discharging step is performed while a voltage is applied to the electrode pattern.

7. The method for manufacturing an electrophoretic display element according to claim 1, wherein the discharging step is performed on the substrate provided with a pattern in the shape of projections and depressions.

8. The method for manufacturing an electrophoretic display element according to claim 1, wherein the discharging step is performed on the substrate provided with a pattern having variations in surface energy.

9. The method for manufacturing an electrophoretic display element according to claim 1, further comprising the step of providing a plurality of nozzles, each of which discharges electrophoretic particles of a different color.

* * * * *